US008560671B1

(12) United States Patent
Yahalom et al.

(10) Patent No.: US 8,560,671 B1
(45) Date of Patent: Oct. 15, 2013

(54) SYSTEMS AND METHODS FOR PATH-BASED MANAGEMENT OF VIRTUAL SERVERS IN STORAGE NETWORK ENVIRONMENTS

(75) Inventors: Raphael Yahalom, Needham, MA (US); Assaf Levy, Palo Alto, CA (US); Omri Kessel, Boston, MA (US); Roee Alon, Tel Aviv-Jaffa (IL); Michael Yaakobi, Tel Aviv-Jaffa (IL)

(73) Assignee: NetApp, Inc., Sunnyvale, CA (US)

( * ) Notice: Subject to any disclaimer, the term of this patent is extended or adjusted under 35 U.S.C. 154(b) by 493 days.

(21) Appl. No.: 12/283,163

(22) Filed: Sep. 9, 2008

Related U.S. Application Data

(63) Continuation-in-part of application No. 10/693,632, filed on Oct. 23, 2003, now Pat. No. 7,617,320.

(60) Provisional application No. 60/993,147, filed on Sep. 10, 2007, provisional application No. 60/993,187, filed on Sep. 10, 2007.

(51) Int. Cl.
*G06F 15/173* (2006.01)

(52) U.S. Cl.
USPC ........... 709/224; 717/124; 711/163; 715/854; 715/855

(58) Field of Classification Search
USPC ........................................................ 709/224
See application file for complete search history.

(56) References Cited

U.S. PATENT DOCUMENTS

| | | | |
|---|---|---|---|
| 6,088,717 A | 7/2000 | Reed et al. | |
| 6,636,981 B1 * | 10/2003 | Barnett et al. | 714/4.5 |
| 6,985,937 B1 | 1/2006 | Keshav et al. | |
| 7,191,285 B2 * | 3/2007 | Scales et al. | 711/114 |
| 7,194,538 B1 * | 3/2007 | Rabe et al. | 709/224 |
| 7,444,459 B2 * | 10/2008 | Johnson | 711/6 |
| 7,523,286 B2 * | 4/2009 | Ramany et al. | 711/170 |
| 7,617,320 B2 * | 11/2009 | Alon et al. | 709/229 |
| 7,836,332 B2 * | 11/2010 | Hara et al. | 714/5.11 |
| 2004/0010787 A1 | 1/2004 | Traut et al. | |
| 2004/0093607 A1 * | 5/2004 | Elliott | 719/326 |
| 2004/0205089 A1 * | 10/2004 | Alon et al. | 707/200 |
| 2004/0225926 A1 | 11/2004 | Scales et al. | |
| 2006/0004830 A1 * | 1/2006 | Lora et al. | 707/102 |
| 2006/0020691 A1 * | 1/2006 | Patterson et al. | 709/223 |
| 2006/0069761 A1 * | 3/2006 | Singh et al. | 709/222 |

(Continued)

OTHER PUBLICATIONS

Storage Network Management Software—The Critical Enabler of Maximum ROI Richard R. Lee and Harriett L. Bennett Storage Consulting Group Published date: Dec. 16, 2002.*

(Continued)

*Primary Examiner* — Tauqir Hussain
(74) *Attorney, Agent, or Firm* — Fulbright & Jaworski LLP

(57) ABSTRACT

Systems and methods for analyzing the service and performance levels associated with virtual machines in a storage network environment for compliance with a resource capacity policy are provided. Component configuration and connectivity information from components in the network environment is collected without using host agents on the virtual machines. Access paths defining end-to-end access relationships between an application on a virtual machine and storage data objects associated with the virtual machine in the network environment are derived. Access paths comprise sequences of components configured to enable information flow between an application residing on a virtual machine and a data object on a respective storage device. Access path resource consumption is computed and virtual machines with resource consumptions that violate the resource capacity policy are identified.

30 Claims, 21 Drawing Sheets

(56) References Cited

U.S. PATENT DOCUMENTS

| | | | |
|---|---|---|---|
| 2007/0192329 A1* | 8/2007 | Croft et al. | 707/10 |
| 2007/0198722 A1* | 8/2007 | Kottomtharayil et al. | 709/226 |
| 2008/0141264 A1* | 6/2008 | Johnson | 718/105 |
| 2008/0155208 A1* | 6/2008 | Hiltgen et al. | 711/154 |
| 2008/0155223 A1* | 6/2008 | Hiltgen et al. | 711/173 |
| 2008/0189468 A1* | 8/2008 | Schmidt et al. | 711/6 |
| 2008/0189700 A1* | 8/2008 | Schmidt et al. | 718/1 |
| 2008/0270564 A1* | 10/2008 | Rangegowda et al. | 709/212 |
| 2009/0025007 A1* | 1/2009 | Hara et al. | 718/105 |
| 2009/0172666 A1 | 7/2009 | Yahalom et al. | |
| 2009/0199177 A1* | 8/2009 | Edwards et al. | 718/1 |

OTHER PUBLICATIONS

International Search Report and Written Opinion dated Mar. 26, 2009 as Application No. PCT/US2008/01930.

* cited by examiner

FIG. 3B

VM Load Analyzer (264) *Last Week*

| | VM | Host | Traffic (MB/s) | Traffic Utilizatio... | CPU Usage... | CPU Utilizatio... | Memory Usage (MB) |
|---|---|---|---|---|---|---|---|
| ⊞ 33 | | 33... | 201.69 | 4.924 | 2,513.53 | 12.029 | 828.63 |
| ⊟ 21 | | 21... | 843.17 | 20.585 | 1,571.31 | 25.734 | 1,308.09 |
| | 194 | 21n | 169.23 | 4.132 | 233.26 | 3.82 | 144.89 |
| | 195 | 21n | 39.97 | 0.976 | 120.18 | 1.968 | 153.18 |
| | 196 | 21n | 79.65 | 1.944 | 165.20 | 2.706 | 117.27 |
| | 197 | 21n | 34.97 | 0.854 | 119.76 | 1.961 | 100.30 |
| | 159 | 21n | 177.92 | 4.344 | 298.12 | 4.882 | 199.46 |
| | 162 | 21n | 88.88 | 2.17 | 205.85 | 3.371 | 159.65 |
| | 161 | 21n | 94.86 | 2.316 | 114.93 | 1.882 | 188.04 |
| | 160 | 21n | 157.69 | 3.85 | 314.01 | 5.143 | 245.31 |
| ⊞ 01 | | 01... | 209.88 | 5.124 | 497.86 | 2.594 | 724.94 |
| ⊞ 03.n | | 03... | 1,934.96 | 47.24 | 1,950.04 | 10.173 | 3,034.44 |
| ⊞ 5 | | 5.na... | 411.33 | 10.042 | 2,116.31 | 34.682 | 1,169.43 |

FIG. 4B

Edit Service Request
Enter the details of the service request

Name: [ERP1]  Owner: [admin]
Requester: [JLR]  E-mail: [jlr@mcnarasaf.com]
Data Center: [Inverness]  SAN: [Building]
Business Unit: [PM]  Project: []
Creation Date: [7/23/07 6:07 PM]  Due Date: [10/15/07]
Ticket: []

| Targets | Requirements | Reservations | Notes |

| Description | Estimated Cost | Actual Cost | Satisfied | Completed |
|---|---|---|---|---|
| ERP | | | | |
| 3 LUNS of 60 GB each from Tier Gold | 19800 | 7200 | ⊘ | |
| 120 GB of raw capacity on storage ... | 18000 | | | |
| 120 GB of raw capacity on storage ... | | | | |
| 120 GB of raw capacity on storage ... | | | | |
| 2 LUNS of 10 GB each from Tier Silver | 1000 | 6400 | ⊘ | |
| Volume 0006 on storage Sym-0050 ... | | 800 | | |
| Volume 0010 on storage Sym-0050 ... | | 800 | | |
| Volume 0005 on storage Sym-0050 ... | | 800 | | |
| Volume 0008 on storage Sym-0050 ... | | 800 | | |
| Volume 0009 on storage Sym-0050 ... | | 800 | | |
| Volume 0007 on storage Sym-0050 ... | | 800 | | |
| 4 switch ports | 800 | 800 | ⊘ | |
| Port fc9 on switch F0brcd-a | | 200 | | |
| Port fc6 on switch F0brcd-a | | 200 | | |

Add ...
Remove
Violations

Total Estimated Cost: 19,800   Total Actual Cost: 7,200   Satisfied Requirements: 3/3   Completed Reservations: 0/15

OK   Cancel

FIG. 6

Chargeback Summary 710

| Tier | Cost (1GB) |
|---|---|
| 2-Silver | $10 |
| 3-Bronze | $8 |
| 1-Gold | $15 |

| Business Unit | 2-Silver 720 | | 3-Bronze 730 | | 1-Gold 740 | | Total 750 | 760 |
|---|---|---|---|---|---|---|---|---|
| | Capacity | Cost | Capacity | Cost | Capacity | Cost | Capacity | Cost |
| Dev | 0 | $0 | 8 | $64 | 32 | $480 | 40 | $544 |
| Customer Support | 0 | $0 | 16 | $128 | 0 | $0 | 16 | $128 |
| Trading | 112 | $1,120 | 0 | $0 | 0 | $0 | 112 | $1,120 |
| Stores | 64 | $640 | 0 | $0 | 0 | $0 | 64 | $640 |
| Marketing | 184 | $1,840 | 0 | $0 | 0 | $0 | 184 | $1,840 |
| Legal | 112 | $1,120 | 0 | $0 | 0 | $0 | 112 | $1,120 |
| Total | 472 | $4,720 | 24 | $192 | 32 | $480 | 528 | $5,392 |

FIG. 7

Chargeback By Business Unit: Marketing — 800

| Tier | Cost (1GB) |
|---|---|
| 2-Silver | $11 |
| 3-Bronze | $8 |
| 1-Gold | $16 |

| Date | 2-Silver | | | | 3-Bronze | | | | 1-Gold | | | | Total | | | |
|---|---|---|---|---|---|---|---|---|---|---|---|---|---|---|---|---|
| | Capacity | Capacity Diff | Cost | Cost Diff | Capacity | Capacity Diff | Cost | Cost Diff | Capacity | Capacity Diff | Cost | Cost Diff | Capacity | Capacity Diff | Cost | Cost Diff |
| 2006-09-01 | 0 | 0 | $0 | $0 | 0 | 0 | $0 | $0 | 0 | 0 | $0 | $0 | 0 | 0 | $0 | $0 |
| 2006-10-01 | 0 | 0 | $0 | $0 | 0 | 0 | $0 | $0 | 0 | 0 | $0 | $0 | 0 | 0 | $0 | $0 |
| 2006-11-01 | 0 | 0 | $0 | $0 | 0 | 0 | $0 | $0 | 0 | 0 | $0 | $0 | 0 | 0 | $0 | $0 |
| 2006-12-01 | 0 | 0 | $0 | $0 | 0 | 0 | $0 | $0 | 0 | 0 | $0 | $0 | 0 | 0 | $0 | $0 |
| 2007-01-01 | 0 | 0 | $0 | $0 | 0 | 0 | $0 | $0 | 0 | 0 | $0 | $0 | 0 | 0 | $0 | $0 |
| 2007-02-01 | 0 | 0 | $0 | $0 | 0 | 0 | $0 | $0 | 0 | 0 | $0 | $0 | 0 | 0 | $0 | $0 |
| 2007-03-01 | 0 | 0 | $0 | $0 | 0 | 0 | $0 | $0 | 0 | 0 | $0 | $0 | 0 | 0 | $0 | $0 |
| 2007-04-01 | 184 | 184 | $2,024 | $2,024 | 0 | 0 | $0 | $0 | 0 | 0 | $0 | $0 | 184 | 184 | $2,024 | $2,024 |
| 2007-05-01 | 184 | 0 | $2,024 | $0 | 0 | 0 | $0 | $0 | 0 | 0 | $0 | $0 | 184 | 0 | $2,024 | $0 |
| 2007-06-01 | 184 | 0 | $2,024 | $0 | 0 | 0 | $0 | $0 | 0 | 0 | $0 | $0 | 184 | 0 | $2,024 | $0 |
| 2007-07-01 | 184 | 0 | $2,024 | $0 | 0 | 0 | $0 | $0 | 0 | 0 | $0 | $0 | 184 | 0 | $2,024 | $0 |
| 2007-08-01 | 184 | 0 | $2,024 | $0 | 0 | 0 | $0 | $0 | 0 | 0 | $0 | $0 | 184 | 0 | $2,024 | $0 |
| Total | 920 | 184 | $10,120 | $2,024 | 0 | | $0 | | 0 | | $0 | | 920 | 184 | $10,120 | $2,024 |

SYSTEMS AND METHODS FOR PATH-BASED MANAGEMENT OF VIRTUAL SERVERS IN STORAGE NETWORK ENVIRONMENTS

CROSS-REFERENCE TO RELATED PATENT APPLICATIONS

This application is a continuation-in-part of U.S. patent application Ser. No. 10/693,632 filed on Oct. 23, 2003, and claims the benefit of U.S. Provisional Application No. 60/993,147 filed Sep. 10, 2007, and U.S. Provisional Application No. 60/993,187 filed Sep. 10, 2007, the contents of which are hereby incorporated herein by reference in their entirety.

FIELD OF THE INVENTION

The systems and methods generally relate to the field of storage capacity management in storage environments with virtual machines or virtual servers.

BACKGROUND OF THE INVENTION

A SAN or storage area network, sometimes called a storage network environment, is a network dedicated to enabling multiple applications on multiple hosts to access, i.e., read and write, data stored in consolidated shared storage infrastructures. A SAN consists of SAN devices, for example, different types of switches, which are interlinked, and is based on a number of possible transfer protocols such as Fiber Channel and iSCSI. Each server is connected to a SAN with one or more network cards, for example, an HBA. Application data is stored as data objects on storage devices in storage units e.g. LUNs. The storage device may be used to store data related to the applications on the host.

In storage network environments, it may be important to detect changes in the network infrastructure or changes in network components and determine the implications of these changes on the storage service levels provided to applications and hosts. Enterprises are increasingly deploying large-scale SANs to gain economies-of-scale business benefits, and are performing and planning massive business-critical migration processes to these new environments. These enterprise SANs may contain hundreds or thousands of servers and tens or hundreds of switches and storage devices of different types. Furthermore, these storage network environments undergo frequent change and growth as, for example, hosts are added to the storage network.

This large size and rate of growth of SANs leads to huge added complexity. The number of components and links which may be associated with the data transfer from each given application and one or more of its data units may increase exponentially with the size of the SAN. This complexity, which is compounded by the heterogeneity of the different SAN devices, leads to high risk and inefficiency. Changes to the SAN (which need to happen often due to the natural growth of the SAN) take a long time to complete by groups of SAN managers or administrators, and are error-prone. For example, in many existing enterprises a routine change (such as adding a new server to a SAN) may take 1-2 weeks to complete, and a high percentage of these change process (sometime as high as 30-40%) include at least one error along the way. It is estimated that around 80% of enterprise SAN outage events are a result of some infrastructure change-related event.

The complexity of storage network environments has recently been further complicated by the increasing adoption of virtual servers or virtual machines (VMs) as hosts within storage network environments. In these environments, one or more of the physical servers or hosts may be further partitioned into one or more virtual servers. Such a virtualization of the physical servers, or virtualization of the storage network environment, allows for efficiency and performance gains to be realized. These gains may be realized in terms of service-level metrics or performance metrics, e.g., storage capacity utilization, server utilization, CPU utilization, data traffic flow, load balancing, etc. It is well known that the higher the number of VMs compressed onto a physical server, the greater the savings. A major benefit of VMs is their ability to stop, shift and restart on different physical servers or hosts. For each physical server or host that is retired in place of a virtual server, there is a corresponding reduction in power, space and cooling requirements. The number of network interface cards, network cables, switch ports, HBAs, fiber channel cables and fiber channel ports are all reduced. These cost reductions are significant, and when compounded with the performance and/or efficiency gains, allow for a much more well-managed storage network environment. In general, the goal of SAN administrators is to maximize resource utilization while meeting application performance goals. Maximizing resource utilization means placing as many VMs per physical server as possible to increase CPU, network, memory, SAN and storage array utilization.

Recently, several market and technology trends have converged to create conditions suitable for virtual server adoption. First, server hardware performance continues to increase faster than the ability of most applications to use it. As a result, many organizations are barely getting above 20 percent server central processing unit (CPU) utilization, a large inefficiency in processor utilization which can be addressed by using virtual servers, or virtual machine, technology, within the physical servers or hosts.

Second, the market adoption of Microsoft™ Windows™ servers running on x86 CPUs has dramatically driven down the cost of computing. However, most system administrators will not run multiple applications on a single system image because they fear that conflicts e.g. DLL conflicts and other incompatibilities will cause systems to crash. The result has been one physical server with one operating system deployed for each application, leading to a proliferation of underutilized servers in the data center. This inefficiency can be addressed with virtual server technology i.e. using virtual servers on one physical server.

Third, many companies are undergoing data center consolidation efforts to control the massive sprawl of underutilized server capacity that is consuming space and power in today's increasingly expensive data centers. Each operating system image and server also requires costly, labor-intensive operating system (OS) patch maintenance and updates to the corresponding physical infrastructure. As part of these consolidation efforts, data center teams must choose between re-hosting these applications on even more powerful virtual servers (exacerbating the underutilization problem) or leaving them on old, unsupported physical server hardware. This consolidation effort can thus be aided with virtual server technology.

In the recent past, companies have been adopting virtualization applications such as VMware™, Microsoft™ Virtual Server, and XEN™. These applications reduce underutilization by enabling data center teams to logically divide the physical servers e.g. x86 servers or hosts into a single, dual, quad or even eight-way and above independent, securely operating virtual server or virtual machine (VM) systems. As explained above, consolidating five, ten, twenty, or even forty server images onto one physical server has tremendous benefit.

Given the rapid rate of adoption of VMs (nearly 80 percent of VM production implementations today are connected to central storage within storage network environments), it seems that virtual server or virtual machine technology is here to stay. Moreover, the adoption of virtual machine technology is projected to grow over the coming years, making it even more important that systems for managing virtualized storage network environments work effectively.

In particular, virtualization of the physical servers or hosts in the storage network environment allows for the possibility of running multiple operating systems and applications on the same physical server at the same time e.g. a single VMware ESX server may by "virtualized" into 1, 2, 4, 8, or more virtual servers, each running their own operating systems, and each able to support one or more applications. This virtualization of the servers may be enabled using software such as VMWare e.g. VMware ESX, which allows the virtualization of hardware resources on a computer—including the processor, memory, hard disk and network controller—to create a virtual server with an independent operating system.

However, with the benefit of virtual machine technology in storage network environments come storage network environment problems that need to be addressed. There is a challenge in terms of determining how to effectively manage the large number of server images or virtual servers on each physical server in a storage network environment. For each VM that is created, a portion of allocated storage is used up. Unless the SAN administrator systemically goes back to delete these storage volumes, the storage space is consumed. This type of VM sprawl has the potential to increase storage consumption by an order of magnitude, thereby reducing the benefit of having virtual servers deployed in storage network environments.

In addition, it is even more difficult to detect network state changes, which occur frequently, within a storage network environment with virtual servers than in a storage network environment with only physical servers. For instance, a failure of a storage area network switch may eliminate an access path between two components on the network thereby disrupting the corresponding data flow to many virtual servers instead of just one physical server.

Because of the potentially large number of components in the storage network environment with virtual server technology, including the potentially large number of virtual servers that may be present in this environment, the very frequent storage network environment changes, the large amount of local state information of each component, and because of the complexity of performing the correlation of the information and analysis of the end-to-end access paths and attributes, any network environment state change detection approach needs to be very efficient to perform the task of detecting changes effectively.

Currently, there are no adequate technological solutions to assist SAN or VM administrators in managing changing storage network environments with virtual machine components e.g. virtual servers. In particular, SAN administrators cannot quickly and dynamically discover all relevant changes in SAN state, particularly in relation to application data requirements involving virtual servers. For instance, a server outage is always a serious event in a storage network environment. In a virtualized storage network environment, however, the impact is an order of magnitude higher simply because for each virtual server outage, many more applications are affected.

Until recently, no software or hardware applications were available to manage virtualized storage network environments. Current storage management solutions rely on host agents in hosts that contain virtual servers (hosts that have been "virtualized") within the SAN to collect a partial set of information from these virtual servers. Using this partial set of information, SAN administrators then rely on manual methods e.g. manual spreadsheet based information entry, trial and error, etc., to manage change events in the virtualized storage network environment. Furthermore, host agents on a physical server are very difficult to manage and/or maintain, and are widely considered undesirable for large SANs in which scalability may be important.

Therefore, there is a need for a solution to the problem of efficiently discovering state change events and analyzing and monitoring service levels and performance metrics in virtualized storage network environments, and for the problem of mapping these changes to access paths and storage service levels or performance level requirements for applications and/or hosts.

SUMMARY OF THE INVENTION

The systems and methods described herein include, among other things, processes for access path awareness and state change management in storage network environments with virtual machine components. The systems and methods allow for a maximization of server consolidation while minimizing the risk of increased storage costs. The systems and methods described herein provide for the capability of uncovering VMs that are no longer operating with their allocated storage space, or VMs that exist and have allocated storage space but are no longer being utilized.

Server consolidation is maximized by providing and storing real-time information on CPU, memory, I/O, ratio of virtual machine to allocated storage volume, network bandwidth, SAN bandwidth, and SAN storage array performance. Using these real-time data and stored historical data, SAN administrators can optimally deploy the correct ratio of VMs per physical server and reach maximum virtual server or virtual machine utilization in a particular implementation.

Most, if not all, virtual machine management applications have focused on managing the VM's themselves and their associated virtual server images, while storage resource management (SRM) applications have focused on utilizing host agents to read file level data for the virtual machines. The systems and methods described herein allow for effectively monitoring virtualized storage network environments without using host agents residing on the physical servers or hosts. These systems and methods use logical access paths in the storage network environment to dynamically track all the end-to-end access relationships, e.g., from an application on a virtual server to a storage volume, such that the service and performance levels of components in the virtualized storage network environment can be monitored.

As used herein, an access path or a logical access path encompasses a logical channel between a given application residing on a virtual server and a given data object, e.g. LUN, along which data may flow. In other words, a logical access path is typically, although not exclusively, a sequence of components starting with a specific application on a specific virtual server via, for example, an HBA, and a sequence of one or more switches and physical links leading to a storage controller and a storage device containing a data object e.g. a LUN. The logical or configuration state of each component along the way in that sequence, for example, the virtual server, the HBA, the storage controller, or the switches, is set such as to not disable data flow between that specific application residing on a virtual server and that specific data object along that specific sequence.

In one aspect, the invention relates to a process for analyzing virtual machines in a storage network environment for compliance with a resource capacity policy. Component configuration and connectivity information is collected from components in the network environment without the use of a host agent residing on the virtual machines. Access paths defining end-to-end access relationships between an application on a virtual machine and storage data objects associated with the virtual machine in the network environment are derived. An access path includes a sequence of components enabling information flow between an application residing on a virtual machine and a data object. The access paths have access path attributes including at least one of a number of hops within an access path, a level of end-to-end redundancy for an access path, and a number of allocated ports for an access path. Access path resource consumption is then computed and a tier level for a virtual machine on the respective access path is determined. Virtual machines in violation of the resource capacity policy are then identified. The resource capacity policy may include a list of virtual machines in the storage network environment and the storage capacity allocated to each of the virtual machines.

In some embodiments, deriving access paths comprises mapping network component configuration and connectivity information to nodes and edges of a graph and determining whether information can flow between nodes in the graph, wherein a node in the graph represents a component in the storage network environment, and an edge represents information flow capability between two components, wherein the information flow capability is determined by a physical communication link between the two components and the logical state configurations of the two components.

In some embodiments, the amount of allocated and reserved virtual machine resources allocated to the application is accumulated and classified into tiers, and into allocated and reserved virtual machine resources on the respective access paths and allocated and reserved virtual machine resources not on a respective access path. The network environment is then monitored for compliance with the resource capacity policy, and virtual machine state change events are detected. In other embodiments, updated virtual machine state information may be obtained and used to compute for an application an accumulated amount of allocated and reserved virtual machine resources allocated to the application and their tier levels. In certain embodiments, the updated state information is used to analyze the allocated and reserved virtual machine resources allocated to or reserved for the application and to determine whether the allocated and reserved virtual machine resources are currently accessible by the application via an access path associated with the virtual machines.

In some embodiments, summary reports about the virtual machines in the network are generated. These reports may contain a current amount of allocated and reserved virtual machine resources, a ratio of the amount of allocated and reserved virtual machine resources to an amount of available virtual machine resources in the corresponding component, or to an amount of allocated and reserved virtual machine resources at other components of the same type and tier, or a cost of the allocated or reserved virtual machine resources.

In another aspect, the invention relates to a process for analyzing service and performance levels associated with virtual machines in a storage network environment for compliance with a resource capacity policy. Component configuration and connectivity information is collected from components in the network environment without the use of a host agent residing on the virtual machines. Access paths defining end-to-end access relationships between an application on a virtual machine and storage data objects associated with the virtual machine in the network environment are derived. An access path includes a sequence of components enabling information flow between an application residing on a virtual machine and a data object. The access paths have access path attributes including at least one of a number of hops within an access path, a level of end-to-end redundancy for an access path, and a number of allocated ports for an access path. Access path resource consumption is then computed and a tier level for a virtual machine on the respective access path is determined. Using the component configuration and connectivity information, a graph is constructed to derive access paths by determining whether information can flow between nodes in the graph, wherein nodes in the graph represent components in the storage network environment, and edges represent information flow capability between two components, and wherein the information flow capability is determined by a physical communication link between the two components and the logical state configurations of the two components. Virtual machines in violation of the resource capacity policy are then identified by comparing the constructed graph to the resource capacity policy to identify violations.

In another aspect, the invention relates to a process for responding to a state change request for a virtual machine in a storage network environment. Virtual machine resources for satisfying the request are selected and access paths associated with the respective virtual machines are derived. The allocation of the virtual machine resources is planned. Virtual machine resources of a selected type and a selected tier level are reserved. Each reserved virtual machine resource is allocated, and additional virtual machine resources are made available. Once the request has been satisfied, it is validated, and designated users are notified of the validation.

In some embodiments, reserving a virtual machine resource comprises either checking that the virtual machine resource is not already reserved or checking that the virtual machine resource is not already allocated. The reservation repository is then informed about the virtual machine resource and reservation attributes, including an associated application, a reservation timestamp, a reservation user, and constraints associated with converting the reserved virtual machine resource to an allocated virtual machine resource.

In some embodiments, allocating virtual machine resources comprises either checking that a virtual machine resource is not already reserved by another application or checking that the virtual machine resource is not already allocated. The reservation repository is then informed about the virtual machine resource and allocation attributes, including an associated application, an allocation timestamp, and an allocation user. The state of a corresponding environment component is then updated to associate the reserved virtual machine resource with a corresponding application.

In certain embodiments, making additional virtual machine resources available comprises informing the reservation repository that the virtual machine resources are available and updating the state of the corresponding environment component to disassociate the corresponding virtual machines from any application.

In another aspect, the invention relates to a system for managing the capacity of virtual machine resources associated with applications in a storage network environment. The system includes a user interface, a display, a memory for storing computer-executable instructions, and a processor in communication with the storage network environment. In some embodiment, the processor is configured for collecting information from sources in the network environment and deriving access paths associated with the virtual server in the network environment. The processor may establish tier levels representative of the importance of a virtual machine resource in the network. The process may compute for an access path associated with respective virtual machines the amount of its allocated and reserved virtual machine resources and the corresponding tier levels, The processor may collect information about virtual machine resources from a virtual machine management platform and tier levels reserved for a host application from a storage management platform. The processor may accumulate for an application the amount of allocated and reserved virtual machine resources allocated to the application and classifying allocated and reserved virtual machine resources tiers and into allocated and reserved virtual machine resources on access paths and allocated and reserved virtual machine resources not on access paths. The processor may construct a virtual machine resource capacity policy. This resource capacity policy may contain the required attributes of virtual machine resources of different types and different tiers reserved or allocated for a set of applications. The processor may periodically collect information from the storage environment components, the reservation repository, and the capacity policy repository, identify a violation, and display the violation on the display.

In some embodiments, a violation is selected to be one of a virtual machine resource that is allocated to an application but is not accessible to that application via an access path, a virtual machine resource that is reserved by an application but not allocated to said application within a pre-selected interval of time, a virtual machine resource that is allocated to an application but with a type or a tier not consistent with the requirements of the capacity policy repository, an amount of resources reserved by an application or allocated to an application not consistent with the requirements of the capacity policy repository, or an amount of virtual machine resources reserved or allocated to a set of storage environment components not consistent with the requirements of the capacity policy repository.

In some embodiments, the processor includes a timestamp processor for associating a timestamp with an event selected from the group of a virtual machine resource allocation event, a virtual machine resource reservation event, a virtual machine resource allocation state, and a virtual machine resource reservation state. The timestamp processor may maintain a list of past and present virtual machine resource allocation states using a data memory, virtual machine resource reservation states, virtual machine resource allocation events, and virtual machine resource reservations events, and use the list with a query processor to provide responses to queries about virtual machine resource allocation and virtual machine resource reservation at a given time.

In some embodiments, the processor includes a projection processor for computing projections of virtual machine allocation states and virtual machine reservation states and of virtual machine resources of specific types and tiers. This computation involves extrapolating and trending from past virtual machine allocation states and past virtual machine reservation states, and using external input from authorized users. The computed projections may be used to provide responses to queries from a designated user interacting with the user interface about virtual machine resource allocation and virtual machine resource reservation at a future time.

In certain embodiments, the processor includes a utilization processor for estimating for a component type or tier, the level of storage capacity utilization. This level of storage capacity utilization is the percent of storage capacity utilized by the component. The utilization processor may compute the level of utilization by computing a ratio of an amount of allocated and reserved virtual machine resources of a storage environment component, a virtual machine resource type, and a virtual machine resource tier, to the amount of allocated and reserved virtual machine resources corresponding to the storage environment component, the virtual machine resource type, or the virtual machine resource tier, and provide violation notifications if the computed ratio is higher or lower than a pre-selected threshold in the virtual machine capacity policy repository.

In some embodiments, the processor includes a comparison processor for periodically computing current virtual machine allocation and reservations of different applications and different virtual machine resources types and tiers. The comparison processor may compare the current virtual machine allocation and reservation with the computed projections. The comparison processor may generate and display a projection violation notification on the display for use by a designated user, update the computed projections, and send the notification to a designated user.

In another aspect, the invention relates to a method for managing the capacity of virtual machine resources associated with applications in a storage network environment. Information is collected from sources in the network environment and access paths defining end-to-end access relationships are derived. Tier levels representative of the importance of a virtual machine resource in the network are determined. For an access path associated with respective virtual machines, the amount of its allocated and reserved virtual machine resources and the corresponding tier levels are determined. Information about virtual machine resources is collected from a virtual machine management platform and tier levels reserved for a host application are collected from a storage management platform. For an application, the amount of allocated and reserved virtual machine resources allocated to the application are accumulated and classified into tiers, as well as into allocated and reserved virtual machine resources on access paths and allocated and reserved virtual machine resources not on access paths. A virtual machine resource capacity policy is constructed. This policy contains the required attributes of virtual machine resources of different types and different tiers reserved or allocated for a set of applications. Information may be periodically collected from the storage environment components, the reservation repository, and the capacity policy repository.

In some embodiments, violations of any of the repositories may be identified. The violation is one of a virtual machine resource that is allocated to an application but is not accessible to that application via an access path, a virtual machine resource that is reserved by an application but not allocated to said application within a pre-selected interval of time, a virtual machine resource that is allocated to an application but with a type or a tier not consistent with the requirements of the capacity policy repository, an amount of resources reserved by an application or allocated to an application not consistent with the requirements of the capacity policy repository, and an amount of virtual machine resources reserved or allocated to a set of storage environment components not consistent with the requirements of the capacity policy repository.

In other embodiments, a timestamp is associated with a virtual machine resource allocation event or a respective virtual machine resource reservation event. In some embodiments, a timestamp is associated with a virtual machine resource allocation state and updating the timestamp after a new virtual machine resource allocation event. In other embodiments, a timestamp is associated with a virtual machine resource reservation state and updating the timestamp after a new virtual machine resource reservation event. In certain embodiments, a list of past and present virtual machine resource allocation states, virtual machine resource reservation states, virtual machine resource allocation events, and virtual machine resource reservations events is maintained. This list is used to provide responses to queries, possibly from a designated user, about virtual machine resource allocation and virtual machine resource reservation at a given time.

In certain embodiments, projections of virtual machine allocation states and virtual machine reservation states and of virtual machine resources of specific types and tiers are computed. This computation involves extrapolating and trending from past virtual machine allocation states and past virtual machine reservation states, and uses an external input from a designated user. The computed projections may be used to provide responses to queries, possibly from a designated user, about virtual machine resource allocation and virtual machine resource reservation at a future time.

In some embodiments, the level of storage capacity utilization for a component type, or tier is computed. This level of utilization may be the percent of storage capacity utilized by the component. The level of utilization may be computed as a ratio of an amount of allocated and reserved virtual machine resources of a storage environment component, a virtual machine resource type, and a virtual machine resource tier, to the amount of allocated and reserved virtual machine resources corresponding to the storage environment component, the virtual machine resource type, or the virtual machine resource tier; and providing violation notifications if the computed ratio is higher or lower than a pre-selected threshold in the virtual machine capacity policy repository.

In some embodiments, current virtual machine allocation and reservations of different applications and different virtual machine resources types and tiers are computed. In other embodiments, the capacity manager compares current virtual machine allocation and reservation with computed projections. In some embodiments, the capacity manager generates a projection violation notification and updates the computed projections. In certain embodiments, the capacity manager may send the notification to a designated recipient, e.g., a SAN or VM administrator.

BRIEF DESCRIPTION OF THE DRAWINGS

The above and other aspects and advantages of the embodiments will be apparent upon consideration of the following detailed description, taken in conjunction with the accompanying drawings, in which like reference characters refer to like parts throughout, which may not be drawn to scale, and in which:

FIG. 3B shows an exemplary virtual machine capacity allocation generated by the virtual machine capacity manager;

FIG. 4B shows an exemplary virtual machine load or capacity analysis based on a screen in the virtual machine capacity manager;

FIG. 6 presents an exemplary reservation specification based on a screen in a virtual machine capacity manager;

FIG. 7 presents an exemplary chargeback or cost summary report generated by a virtual machine capacity manager;

FIG. 8 presents an exemplary chargeback or cost summary report, with further breakdown by different days, generated by the virtual machine capacity manager;

FIG. 10B presents an exemplary listing of virtual machine change events generated by the virtual machine capacity manager;

FIG. 11B illustrates an exemplary embodiment of the virtual machine capacity management process of FIG. 10A in which violations of the capacity policy and access path policy are listed;

FIG. 12B illustrates an exemplary listing of violations generated by the virtual machine capacity manager.

DETAILED DESCRIPTION OF ILLUSTRATIVE EMBODIMENTS

The systems and methods, in various embodiments, provide, among other things, processes for capacity management in virtualized storage network environments i.e. storage network environments in which physical servers or hosts have been partitioned into virtual servers. Although the embodiments described below reference a SAN with virtual machines, the description does not limit the invention, and the various embodiments set out below and depicted in the figures are merely provided for the purposes of illustrating certain embodiments of these systems and methods and for describing examples of such systems and methods. It will be apparent to those of skill in the art that the systems and methods described herein may, in certain forms, be employed in other types of storage infrastructure environments or any other networks for which access paths are defined and monitored.

Figure 1:
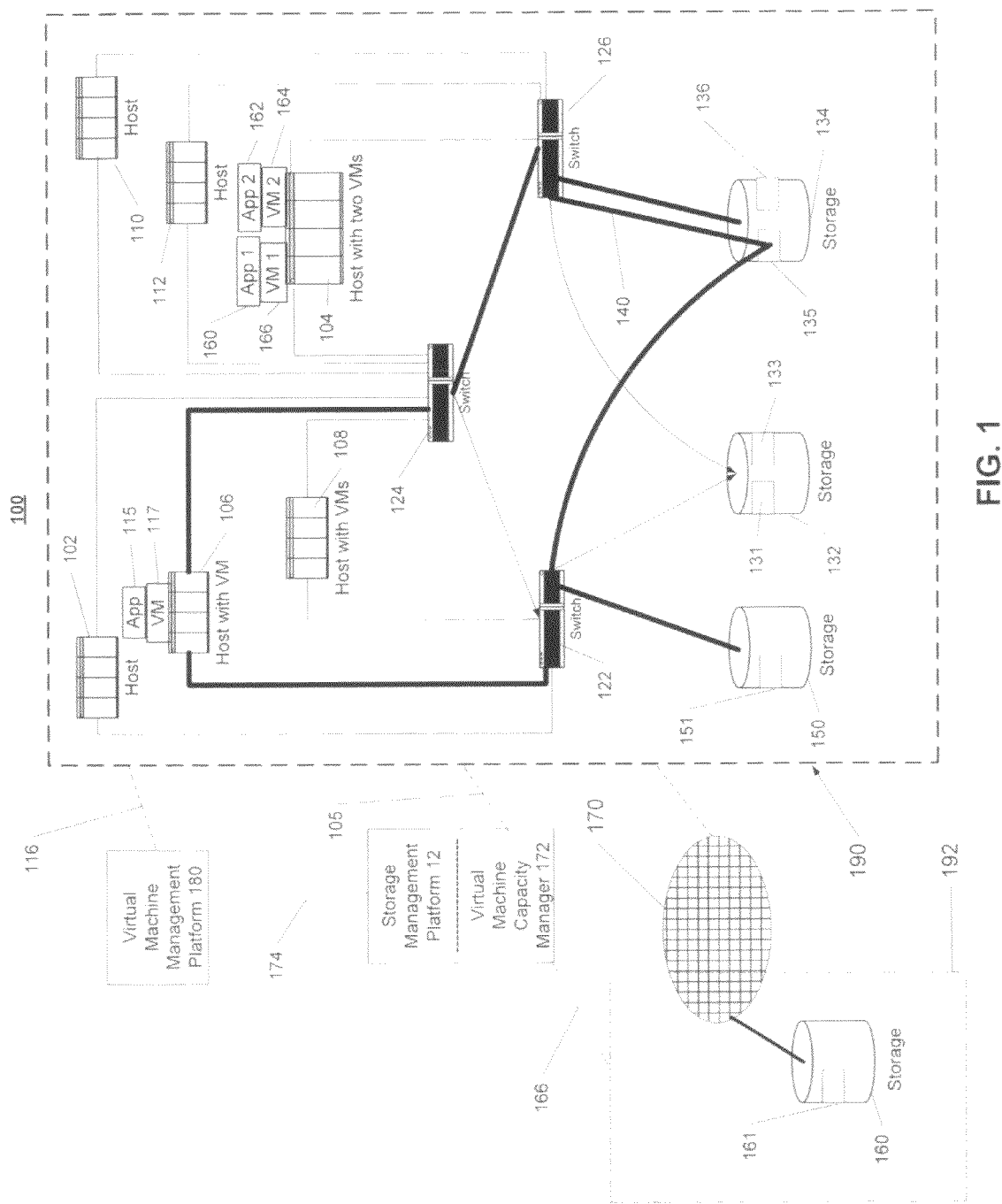
FIG. 1 shows a topological view of an exemplary storage area network infrastructure containing one or more virtual machines or virtual servers, according to an illustrative embodiment.

FIG. 1 shows a topological view of an exemplary SAN 100, according to an illustrative embodiment. As shown in FIG. 1, SAN 100 includes hosts (such as 102, 104, 106, 108, 110 and 112), virtual machines or virtual servers associated with physical servers or hosts (such as 117, 166, and 164), applications running on the virtual machines (such as 115, 160 and 162), switches (such as 122, 124 and 126), and data storage devices (such as 132, 134, and 150). The storage devices may be, for example, disk drives, such as RAID devices, tape drives, or other types of mass-storage devices. The virtual machines or virtual servers (such as 117, 166, and 164) are able to support their own operating system and applications, and have all the same "virtual" components that are found in typical x86 computer e.g. a motherboard, a graphics card, a network card, a network card controller, memory, etc. Thus, a virtual server can operate as the equivalent of a physical server. This type of virtualization of the physical server may be enabled in hardware or in software, as will be described below.

Storage devices may contain allocations for the virtual machine servers (or virtual servers, or virtual machines) e.g. 131, 133, 134, and 135, which are stored, sometimes with data objects or data stores e.g. LUNs, on the storage devices. Applications execute on hosts, for example application 115 on host 106, and require read and write access to certain volumes on storage devices. SAN 100 could include multiple segments, e.g., segments 192 and 170. Some of these segments may include virtual machines or virtual servers, e.g., segment 192, while others may not include virtual machines or virtual servers, e.g., segment 170.

SAN 100 in FIG. 1 also includes an external virtual machine capacity manager 172, part of a Storage Management Platform (SMP) 12, which interacts with the storage infrastructure components and performs analysis and management tasks. SMP 12 may include some storage network environment monitoring hardware and software e.g. NetApp's SANScreen which interfaces with the SANs via paths 105 and 166 respectively. The SMP and the virtual capacity manager 172 may also interact with Virtual Machine Management Platform (VMMP) 180 via path 174. Thus, the virtual servers in the storage network environment share their state and configuration information with VMMP 180, which in turn shares this information, either voluntarily or via requests, with SMP 12 and virtual machine capacity manager 172. This information may be shared on a periodic basis, e.g. every 2 minutes, or more frequently.

VMMP 180 may include some virtualization software e.g. VMware ESX or VMware virtual management center which interfaces with the virtual machines in the SAN via path 116. Such software, when running on the physical servers e.g. ESX servers, enables virtualization by allocating hardware resources dynamically such that the applications running on the virtual servers are unaware of the virtualization that has been enabled. In addition, such software may interface with SMP 12 to provide the SMP with information about the virtual servers.

VMMP 180 may provide information on the number and location of the physical servers, the number and location of the virtual servers, the number and location of the data stores or data objects associated with these virtual servers, the state of a virtual server e.g. a virtual machine is powered on or off, or the characteristics of the data traffic flow through the virtual server. In this manner, virtual machine capacity manager 172 may communicate periodically with each SAN component and with VMPP 180 (thereby communicating with the virtual servers), to obtain the current state configuration of the component and the characteristics of the data traffic that traversed through that component since the last periodic query, e.g., the amount of data transferred, on which ports, etc.

Each SAN component in SAN 100 has a certain type which defines its category (e.g. disk storage device, virtual machine storage device, tape storage device, etc), its manufacturer (e.g. vendor name, such as EMC, IBM, NetApp, etc), its product name (e.g. Symmetrics, Clarion, Shark, VMware, etc)., and its model number (e.g. its version, add-ons, etc).

Each storage network component e.g. a virtual machine 166 on host 104, or switch 122, or host 110, or application 160, in SAN 100 also has an internal state. The internal state of each storage network environment component at each point of time contains values for various execution state variables (such as for example amount of data that flowed through a certain port in a recent interval, or the data stored at a particular location) as well as configuration state variables (such as which ports are enabled, which other component is connected via each ports, what are the set transfer rates, which zones are defined, which are the members of each zone, etc). For example, for a data store or storage device, the state may include an indication of whether a corresponding virtual machine is powered on or powered off, whether a virtual machine in the storage network environment is able to utilize that data store, what the current or past storage space allocation to that virtual machine is, or an indication of which, if any, unused data stores or storage devices exist in the storage network environment. For a virtual machine or virtual server, the state may include an indication of whether that virtual machine is powered on or powered off, the central processing unit (CPU) utilization in that virtual machine, the memory utilization in that virtual machine, or the traffic flow through that virtual machine. Some of these state variables can be changed by a designated user e.g. a SAN or VM administrator, while others may be automatically set by the VMMP 180 in response to other changes in the storage network environment. Changes to execution state variables occur as a result of data flow related activities, whereas changes to the configuration state variables occur as a result of planned or unplanned configuration actions.

Each storage network component in SAN 100 may have multiple attributes associated with it that characterize various aspects of the functionality of that component. For example the attributes of a switch may include among others the maximum number of ports, the maximum data transfer rates, etc. The attributes of a virtual machine component may include among others the maximum storage capacity, the CPU utilization, the traffic flow, the memory utilization, the maximum rate of data reads or writes, the RAID level, etc. The value of some of these attributes can be obtained by querying the virtual machine component via VMMP 180, whereas the value of other values can be deduced from the component type (that is from the information about manufacturer, product, model, etc.). The attributes of the virtual servers or virtual machines may be obtained and stored by the VMMP 180 and then transferred to the SMP 12.

An access path or a logical access path in the SAN 100 encompasses a logical channel between a given application on a virtual server or physical server and a given data store or data object, e.g. LUN, along which data may flow. In other words, a logical access path is typically, although not exclusively, a sequence of components starting with a specific application on a specific virtual or physical server via, for example, an HBA, and a sequence of one or more switches and physical links leading to a storage controller and a data object e.g. a LUN on a storage device. The logical or configuration state of each component along the way in that sequence, for example, the HBA, the storage controller, the switches, or the virtual servers is set by a designated user, e.g., a SAN or VM administrator, or by the SMP 12 and VMMP 180, such as to not disable data flow between that specific application on the virtual or physical server and that specific data object along that specific sequence.

Access paths in SAN 100 and their related access characteristics are realized by setting up multiple underlying devices of different types. This set up may be carried out by a designated user or carried out automatically by the VMMP 180 and SMP 12. These underlying operations include multiple physical and logical basic set up actions which need to be set up in different locations and device types and with mutual consistency. Nonetheless, the end-points in SAN flows generally have a relatively strong exclusive access relationship. That is, each application on a SAN-connected virtual server or physical server (the host) typically requires access, and often exclusive access, only to some specific SAN data objects (LUNs) on the storage devices. Consequently, in storage area networks each source end point, i.e., the applications on the virtual or physical server (host), will typically need to interact only, and often exclusively, with a specific, small number of target end points, e.g., the LUNs on the network storage devices. The virtual servers share their state and configuration information with the VMMP 180, which in turn shares this information with SMP 12 and virtual machine capacity manager 172.

In preferred embodiments, the sequence of components between an application on a host and one of its data objects stored on one or more storage devices, their types, attributes, state set up, and connectivity between them determine the level of service provided to that application. That level of service includes, for example, aspects of performance and availability for data flow through a virtual server, and mutual consistency with a pre-defined resource capacity policy. For instance, such a resource capacity policy for virtual machine resources may include a designated user's (or computer-generated) requirements for a virtual machine in terms of traffic utilization, CPU utilization, and/or memory usage. For instance, a service level may include a requirement that all virtual machines in the same virtual cluster have access to the same data objects or data stores. This requirement may be set such that each virtual cluster can be implemented on the same physical server e.g. an ESX server. If this service level is not met, SMP 12 and VM capacity manager 172 interact to provide a notification of a service level violation. Service level may also refer to the availability of an access path for data storage or the capacity of a data store associated with an access path.

An access path between an application on a virtual server and a data object on a storage device may be a sequence of components as described above which are set to enable information flow between the application residing on the virtual or physical server (the host) and the data object on the associated storage device. Access path attributes (e.g. a number of hops within a valid logical access path, a level of end-to-end redundancy for a valid logical access path, and a number of allocated ports for a valid logical access path, bandwidth, component interoperability, proximity constraints, and type of storage network environment component authentication) associated with each such end-to-end access path determine the level of storage service provided to that application.

In some embodiments, computing the associated access path attribute values involves constructing a graph representation of the network topology such that each node in the graph represents a device or component in the storage network environment, and each edge represents an information flow capability between two devices, wherein the information flow capability is determined by a physical communication link between the two devices and the logical state configurations on the two devices. These aspects of access path awareness and discovery, among others, are described in commonly-assigned U.S. patent application Ser. No. 10/693,632, the content of which is hereby incorporated herein in their entirety.

Part of the internal; configuration state of each component in SAN 100 contains information about the allocation of each virtual machine resource e.g. storage space, CPU, memory, or traffic load, or set of virtual machine resources, of that component for the exclusive use of one or more external entities, such as an application, a set of applications, other components, etc. For instance, state configuration information may include one or more of a virtual or physical server ID, a virtual or physical server port configuration, a switch port configuration, a switch ID, a switch IP and domain ID, a grouping of storage devices, a zoning of storage devices, a storage device ID, LUNs associated with storage devices, and LUN masks associated with storage devices.

Virtual machine resources of a components in SAN 100 which are not allocated are considered available. For example, if 60% of the CPU of a virtual machine is allocated to a particular application, the remaining 40% is considered available to other applications accessible to that virtual machine. Allocated virtual machine resources at a component can be de-allocated and the internal configuration state updated accordingly, and afterwards they can be allocated again to particular applications or components. The allocation and de-allocation of resources may be performed by a designated user or by a combination one or both of VMMP 180 and SMP 12.

A virtual machine resource is allocated to an access path associated with a virtual machine e.g. storage volume 134 in SAN 100 if it is allocated either to an application running on a virtual server 115 or to a component which is part of that access path e.g. switch 122. A virtual machine resource is associated with an application if it is allocated to that application or to a component on an access path associated with that application.

For instance, in the exemplary embodiment in FIG. 1, with appropriate state configurations on storage environment components 124, 126, and 134, these components may form an access path between application 115 running on virtual server 117 on host 106 and the corresponding volume 135 on data storage device 134. Volume 151 may be a local replica of volume 135, while volume 161 may be a remote replica of volume 151, and so both of these are replica extensions of the access path between application 115 and volume 135.

In certain embodiments, to discover all the access paths associated with virtual machines or virtual servers in the storage network environment, compute their end-to-end attributes, and establish that they are consistent with the set access path policy requirements, information needs to be obtained from the different storage network environment components regarding their types, state, and connectivity. These aspects of access path awareness and discovery, among others, are described in commonly-assigned U.S. patent application Ser. Nos. 10/693,632, 11/529,748, and 11/965,392, the contents of which are hereby incorporated herein in their entirety.

Based on its access path attribute values e.g. a number of hops within a valid logical access path, a level of end-to-end redundancy for a valid logical access path, and a number of allocated ports for a valid logical access path, bandwidth, component interoperability, proximity constraints, and type of storage network environment component authentication, each storage network environment component, e.g., a virtual machine 117 on host 106 in SAN 100, can be classified to a tier level. The tier level of a storage environment component in a SAN e.g. SAN 100 represents a rank classification, relative to other components of the same type and category, of the level of storage service it can support in key storage service parameters (such as availability and performance).

For example a high performance storage device e.g. an EMC DMX or VMware ESX, with appropriate set-up can be classified as a Tier 1 component due to its superior data read/write rates attribute characteristics (performance), and its internal redundancy characteristics (availability), relative for example to mid-range storage devices e.g. EMC Clarion which has lower performance and availability characteristics and can be classified to a lower Tier (such as Tier 2).

Each storage environment component corresponds to a certain amount of virtual machine resources. Each such virtual machine resource can be allocated for an exclusive use by a single entity (such as a single application on a host) or by a set of entities (such as a number of applications on a number of hosts). The type of virtual machine resources which are associated with a component depend on the component type. For example the resources of storage devices include units of storage capacity i.e. data store or data object capacity, whereas resources of switches include the switch port utilizations.

Each storage network environment resource can also be classified to a tier level representative of the importance of that resource in the storage network environment. The tier level e.g. low (bronze), medium (silver), or high (gold), of a resource is determined by the tier of the component with which it is associated, as well as possibly by additional characteristics specific to that resource. For example the tier level of a volume of data stored on a storage device is determined by the tier level of the corresponding storage device, as well as the level and type of replication of that data volume on other storage devices.

The tier classification of components and resources represent a layer of abstraction of the storage environment representing normalization of service level across different components and components types in the environment. Such a normalized layer of abstraction is useful for gaining visibility into the end-to-end storage environment and managing and controlling, in an optimal manner, both the service levels provided to applications on one hand, and the amount of virtual machine and other resources (and costs) required to provide that level of service.

Figure 2:
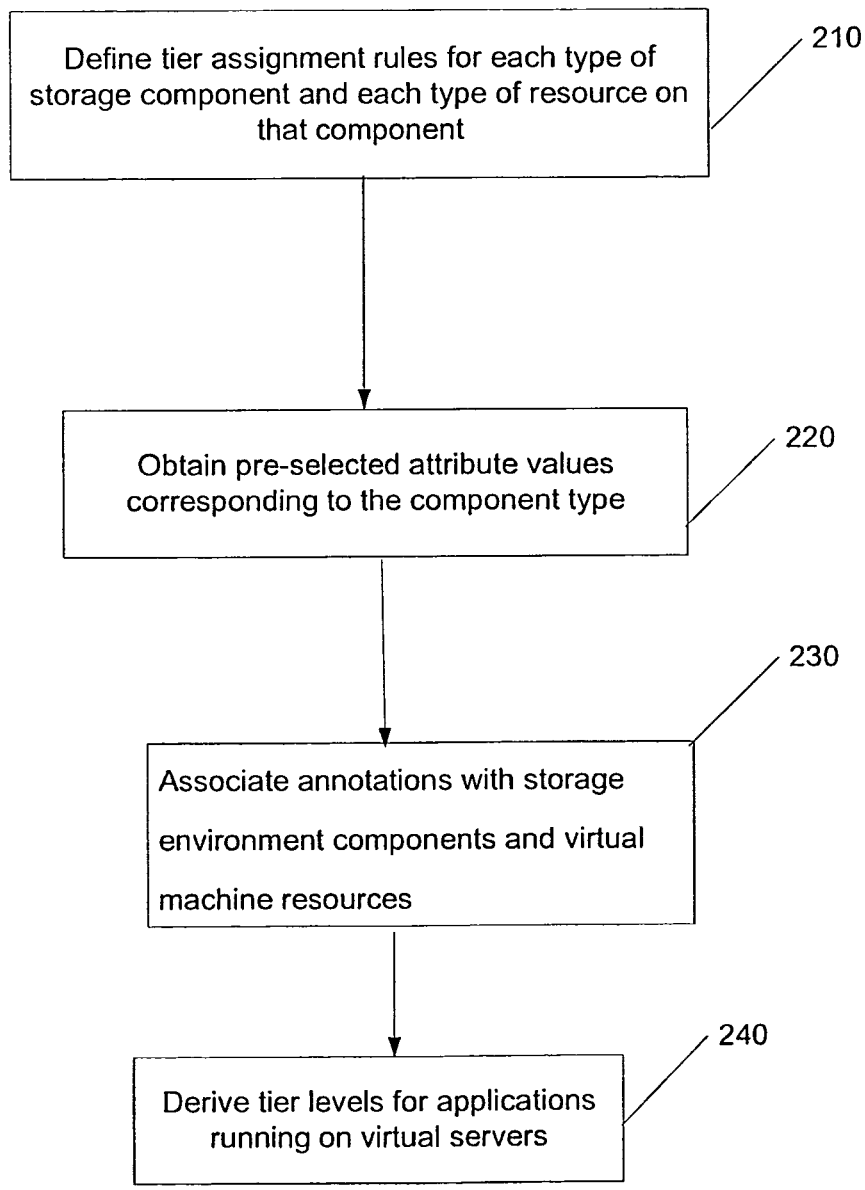
FIG. 2 shows a process flow for the tiering module of the capacity manager.

The Virtual Machine Tiering Module within the Virtual Machine Capacity Manager in a storage network environment, e.g., VM capacity manager 172 of SAN 100 in FIG. 1, performs the process 200 depicted in FIG. 2. The steps involved in the process are now described in relation to FIGS. 2, 3A, 3B, 3C, 4A, and 4B.

Step 210: Define generic tier assignment rules for each type of virtual machine storage component and each type of virtual machine resource on that component based on type and attribute value information.

Figure 3A:
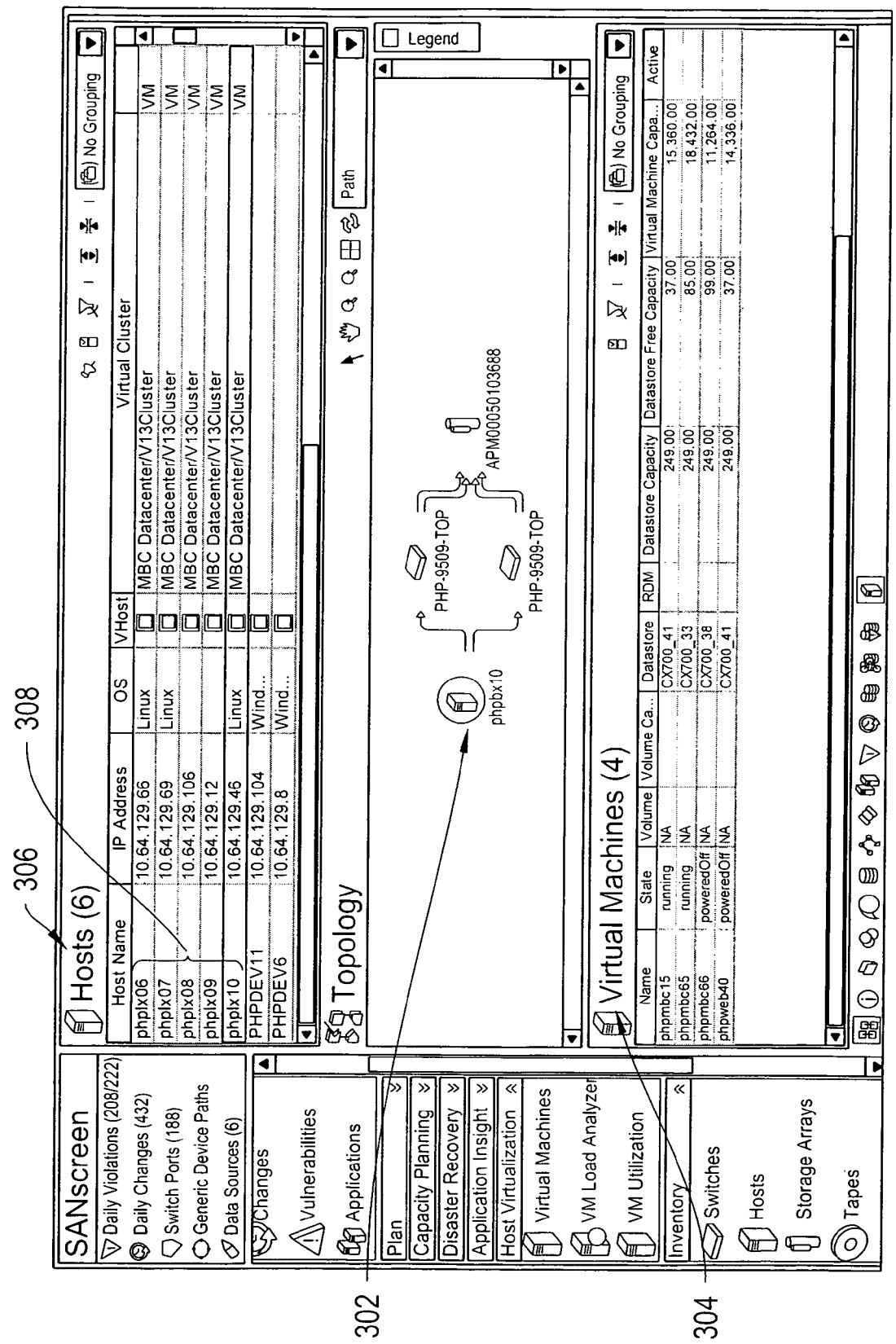
FIG. 3A shows an exemplary set of virtual machines (or hosts) and a corresponding access path in the storage network environment generated by the virtual machine capacity manager.
Figure 3B:
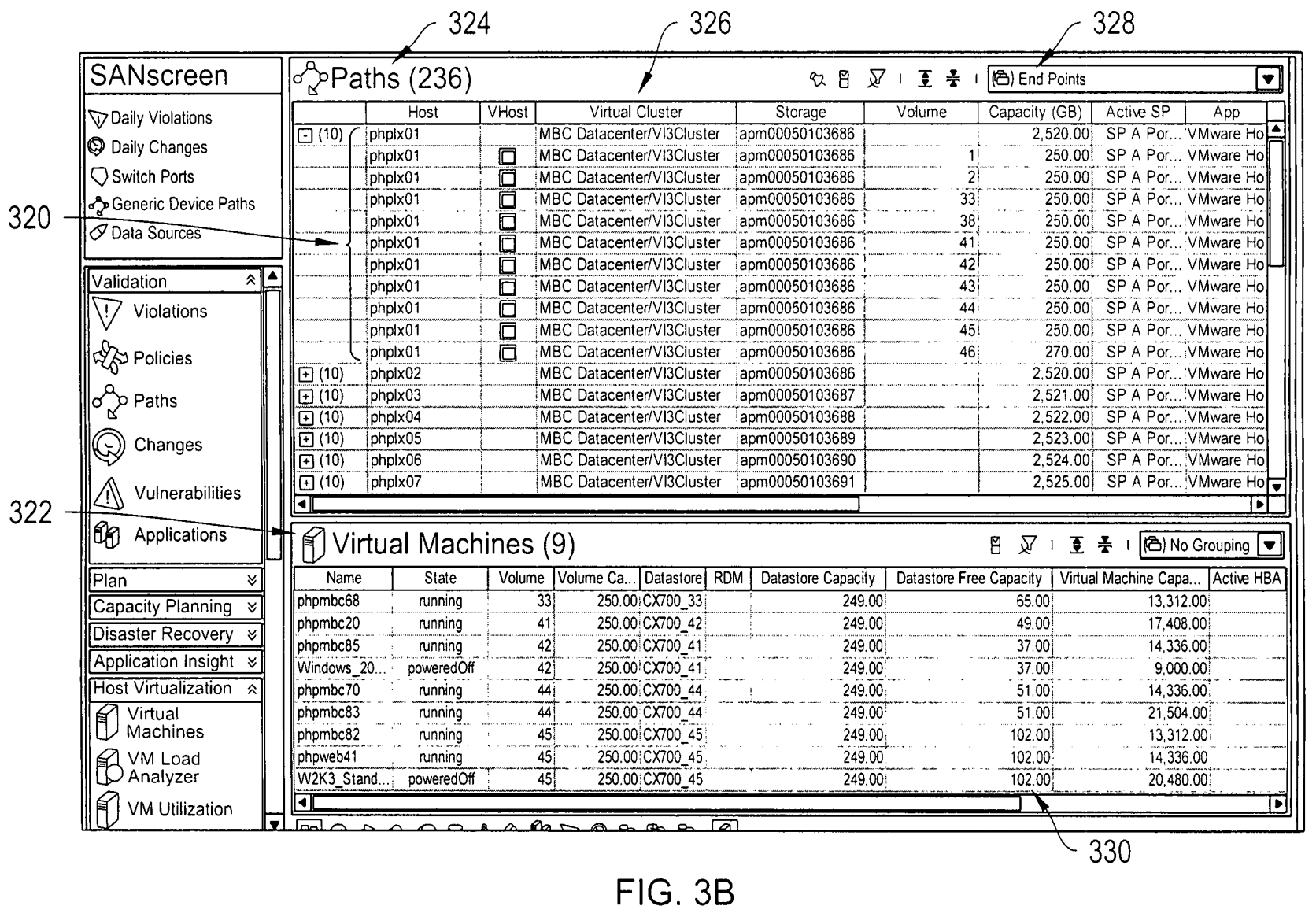

For example, a rule also specify the virtual machine capacity allocation (or an access path or resource capacity policy) for a set of virtual machines. For instance, FIG. 3A shows an exemplary virtual machine capacity allocation 306 and an associated access path 302 based on a screen in the virtual machine capacity manager. In this example, virtual machines 308 are grouped based on the physical volumes they are associated with e.g. virtual storage volumes associated with physical storage volume phplx are labeled 308. The data storage capacity of each of the virtual volumes and the free storage capacity of each of the virtual volumes are depicted in window 304 in FIG. 3A. FIG. 3B is an exemplary virtual machine allocation which shows a set of virtual machines 322, including a virtual machine cluster 326, associated with network paths 324. Also shown in FIG. 3B, are the data store capacities 330 associated with the virtual machines associated with physical server phplx 320.

Figure 3C:
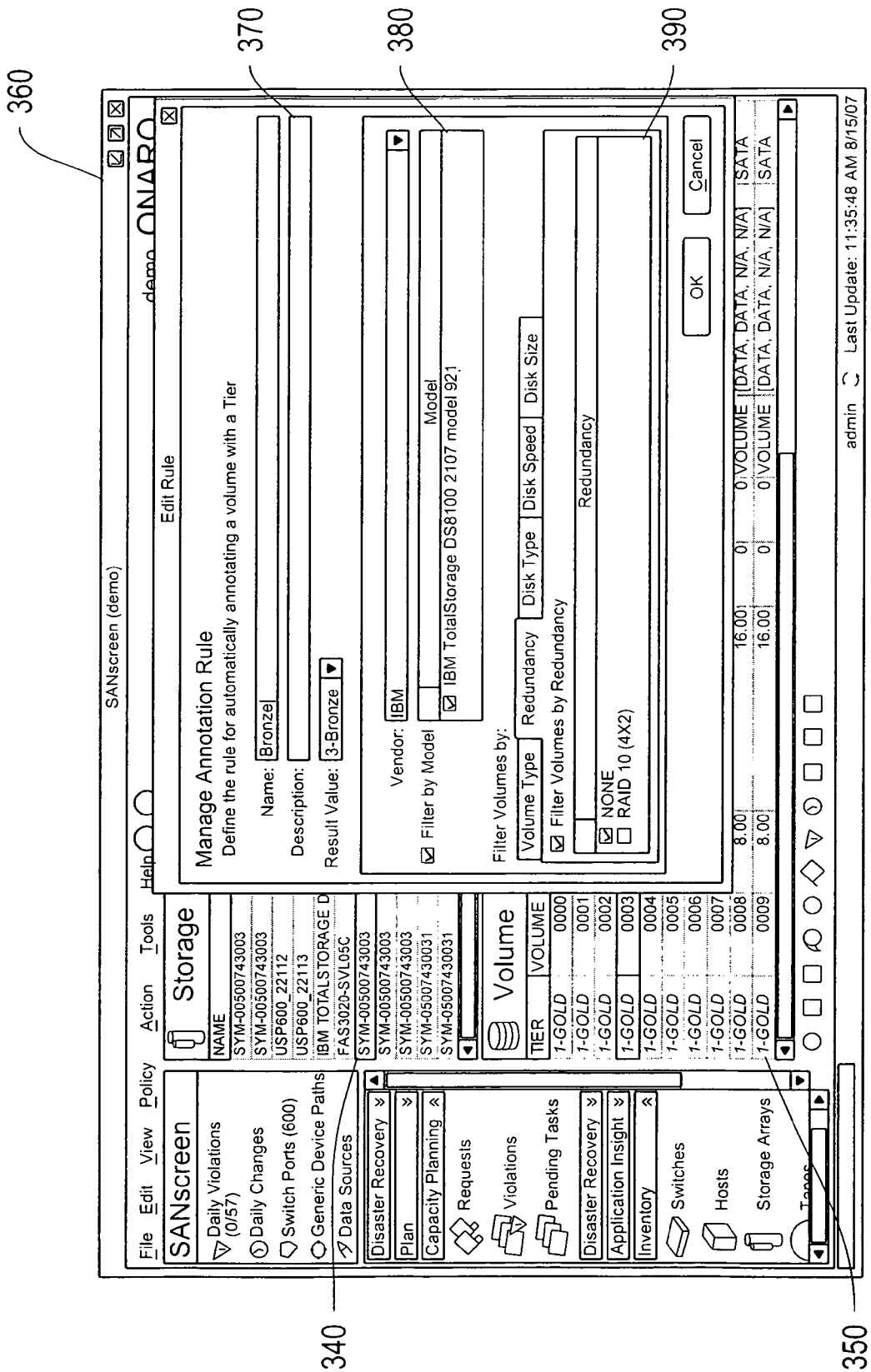
FIG. 3C shows an exemplary tier rule specification based on a screen in the virtual machine capacity manager.

A rule may also specify that all virtual machine or physical storage devices of type EMC DMX or VMware ESX with a certain RAID set-up level are classified as Tier 1. FIG. 3C includes an exemplary tier rule specification based on a screen 360 in a Tier Management module of a Virtual Machine Capacity Manager, which could be generated at step 210 of process 200. In this example volumes in storage device of type IBM storage DS8100 2107 Model 921 (380) which have no redundancy (390) will be classified as Tier 3—Bronze (370) whereas the volumes in storage device of type EMC Sym (340) are classified as Tier 1—Gold (350).

Step 220: Interact with each storage environment component and obtain selected attribute values corresponding to the component type. For example, in the exemplary environment of FIG. 1, the model of virtual machine storage device 150 can be obtained, as can the model and data transfer parameters of switch 122.

Step 230: Associate Annotations with virtual machine storage environment components and resources. Component Annotations values are stored internally at the Virtual Machine Capacity Manager associated with the corresponding component id, and can be updated when required. Component Annotation values are considered as additional component attribute values, and can be used for management operational process and can be used with the rules to derive Tiers of components and virtual machine resources.

Figure 4A:
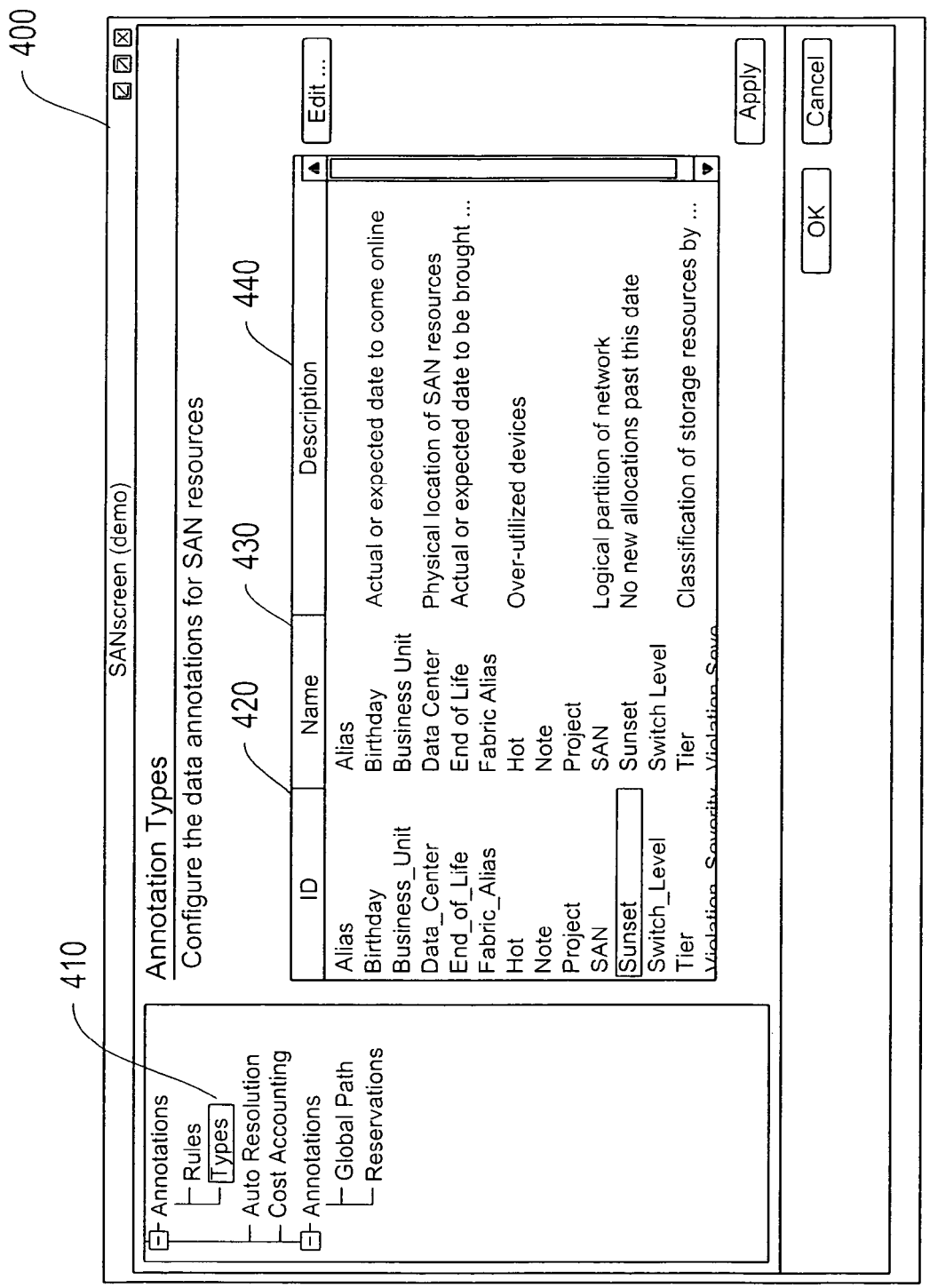
FIG. 4A includes an exemplary tier annotation specification generated by the virtual machine capacity manager.

FIG. 4A includes an exemplary tier annotation specification based on a screen (400) in a Virtual Machine Capacity Manager. A variety of annotation types are specified (410) each with its identifier (ID) (420), name (430), and description (440). For example, the sunset annotation is an attribute whose value specifies the last date by which allocations can be performed at this virtual machine component.

Step 240: Using tier rules derive tier level of virtual machine components and resources based on attribute value and annotation values. Rules precedence determines the order by which rules should applied and which results should take precedence in cases of ambiguity in results.

For example in the exemplary environment of FIG. 1, storage devices 150 and 131, and switch 122 may be determined as being Tier 1 components based on their models and set-up attributes, while storage device 134 may be determined to be a Tier 2 level component. That implies that components 150, 132, and 122 have characteristics which correspond to high levels of performance, availability normalized values, while a component such as 134 has lower corresponding performance and availability values.

Data objects replicas which are derived by various type of copy activities from the target data object of an access path associated with a virtual machine are considered as replica extensions of that access path.

In the exemplary embodiment depicted in FIG. 1, with appropriate state configurations on storage environment components 124, 126, and 134, these components may form an access path between application 115 on virtual server 117 on host 106 and its associated data store 135 on data storage device 134. Volume 151 is a local replica of volume 135 and volume 161 is a remote replica of volume 151, and so both of these are replica extensions of the access path between application 115 on virtual server 117 and volume 135.

In certain embodiments, to discover all the access paths in the storage network environment, compute their end-to-end attributes, and establish that they are consistent with the set policy requirements, information needs to be obtained from the different components regarding the types, state, and connectivity. These aspects, among others, are described in commonly-assigned U.S. patent application Ser. Nos. 10/693,632, 11/529,748, and 11/965,392, the contents of which are hereby incorporated herein in their entirety.

In certain embodiments, the information described above is correlated and analyzed by mapping to an abstract graph-model representation in which each node represent a component and links between nodes represent connectivity between components and internal or configuration state information in each virtual machine storage network environment component.

For instance, each SAN device may be represented as a node in the graph. End-nodes represent applications/virtual servers (source end-points) and virtual storage/data objects e.g. Volumes or LUNs (target end-points). In the first part of the abstract graph construction each edge between nodes represents an existing physical link between the SAN devices (or between a SAN device and a SAN end-points). In the next part of the constructions edges are eliminated in each case of a logical constraint, as defined in a device configuration, which disable flows on that link. The result of this iterative construction is an abstraction in which a logical access path between one application on a virtual server and a data object e.g. Volume or LUN on a virtual storage device exists if and only if a path exist in the abstract graph between the corresponding end nodes. An intermediate node is a node that is connected to two or more end nodes.

For the sake of process efficiency, the iterative step of graph edge elimination or pruning based on logical constraints implied by device configuration set-up is performed in a order designed to achieve as much pruning as early as possible. For that purpose SAN semantics or the required service levels are utilized to determine the order in which device constraints are considered. For example, LUN masking constraints on one device constraining most of the potential flows along the physical paths may be used to prune the graph first before a zoning constraint on another which restricts a smaller number of flows.

In certain embodiments, access path attributes are computed for each of the existing logical access paths associated with virtual machines according to the required attributes values specified in the logical access paths policy. The attribute values include, inter alia, level of end-to-end redundancy; type of redundancy; number of hops; and number of allocated ports.

Each storage infrastructure component of any type and tier may have resources associated with it which can be utilized by applications residing on one or more virtual servers. The type of each resource corresponds to the type of the component in which the resource is located. The resource capacity of each type of resource is the amount of virtual machine resources of that type at a specific component or set of components.

Part of the internal; configuration state of each component contains information about the allocation of each virtual machine resource, or set of virtual machine resources, of that component for the exclusive use of one or more external entities, such as an application, a set of applications, other components, etc.

Virtual machine resources of a components which are not allocated are considered available. Allocated virtual machine resources at a component can be de-allocated and the internal configuration state updated accordingly, and afterwards they can be allocated again to particular applications or components.

A virtual machine resource is allocated to an access path if it is allocated either to an application or to a component which is part of that access path. A virtual machine resource is associated with an application if it is allocated to that application or to a component on an access path associated with that application and/or virtual machine. State change events at the storage environment can change any part of the state of any component, or the connectivity between components. Such state change events may also include changes to the configuration state and so changes to the allocations of resources to applications, to other components, and to access paths associated with virtual machines.

Each component of any type or tier may be associated with attributes describing its cost, its power consumption, its heat generation, its physical space consumption, etc.

A capacity manager, e.g. VM capacity manager 172 of FIG. 1, may store internally additional annotation attributes which are associated with individual components and contain additional descriptive values associated with this component.

A capacity manager also includes an internal reservation repository in which any virtual machine resource at any component in the environment which is not already allocated or reserved can be marked internally at the reservation repository as reserved to a particular application, or a to a set of applications or components.

Figure 5:
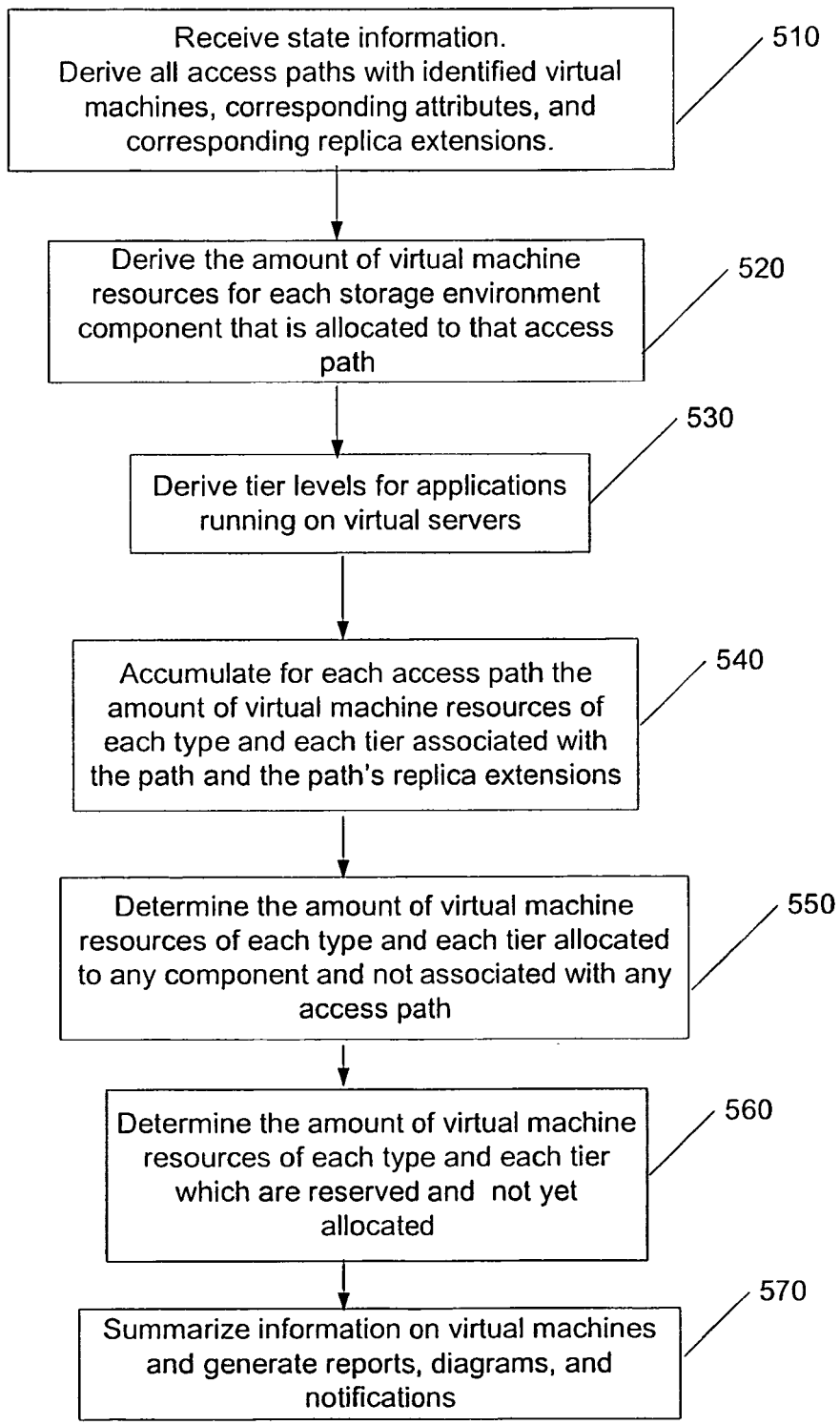
FIG. 5 shows a process performed by a Storage Management Platform (SMP) which may be part of a virtual machine capacity manager.

The following process is performed by the Storage Management Platform (SMP) 12 of FIG. 1 for the purpose of analyzing and reporting the end-to-end capacity status of the storage environment, as depicted in FIG. 5, and described in relation to FIGS. 4B, 5, 6, 7, 8A, 8B, and 9. To carry out this process, SMP 12 may interact with VM capacity manager 172 and VMMP 180, both shown in FIG. 1.

Step 510: Periodically, i.e. at discrete time intervals, say once every two minutes, the SMP receives from each component in the storage environment an update message containing its state. All access paths associated with storage devices, corresponding attributes, and corresponding replica extensions, are derived and updated internally as described above.

For example, in the exemplary environment depicted in FIG. 1 the SMP may derive the access path associated with a storage device starting with application 115 on virtual server 117 on host 106 and comprising of components 124, 126, and 134 and data store volume 135, with replica extensions of volume 151 on device 150 and volume 161 on device 160.

Step 520: For each access path, and replica extensions of that access path, derive the amount of resources at each virtual machine storage environment component that are allocated to that access path. For instance, FIG. 4B shows an exemplary virtual machine load or capacity analysis 450 organized by host 470 based on a screen in the virtual machine capacity manager. The virtual machine capacity analysis in this exemplary screen have been performed over a time period of one week as pointed out in labels 460*a* and 460*b*. Columns 480, 482, 484, 486, 488 show data on the virtual machine traffic loads, traffic utilization, CPU usage, CPU utilization, and memory usage, respectively.

For storage device components the resources allocated to a path include storage resources (such as LUNs) of various capacities. For network switches components the resources allocated to a path include a number of switch ports.

For example, in the exemplary environment depicted in FIG. 1 for the access path from application 115 on virtual server 117 to volume 135, the virtual machine resources allocated to that path (either exclusively or shared with one or more additional access paths) include the storage capacity consumed by volume 135 on storage component 134, the storage capacity consumed by volume 151 on storage component 150 (replica extension), the storage capacity consumed by volume 161 on storage component 160 (replica extension), as well as the number of input and output ports allocated to each of switches 122, 124, and 126.

Step 530: For each access path, and replica extensions of that access path associated with virtual machines, derive and the tier level of each associated component and each resource, using the tier assignment process described above.

For example in the exemplary environment of FIG. 1 it may be determined that storage devices 134, and 150 and storage volumes or data stores 135 and 151 are tier 1 where as storage device 160 and virtual storage volume 161 are Tier 2 devices.

Step 540: For each access path accumulate the amount of resources of each type and each tier associated with that path and the path's replica extensions.

For example in the exemplary storage network environment 100 of FIG. 1, the amount of Tier 1 storage resources associated with the access path of application 115 on virtual server 117 to virtual machine volume 135, are the storage capacity of volumes 135 and 151, whereas the amount of Tier 2 storage resources associated with that path is the storage capacity of virtual machine volume 161.

Step 550: Determine the amount of resources of each type and each Tier which are allocated to any storage environment component and are not associated with any access path of access path's replica extensions.

Such resources, which may be currently unusable, are a result of on-going infrastructure changes, or of errors or omissions in operational processes and so in that case may constitute potential for reclamation.

For example in the exemplary environment of FIG. 1 the amount of Tier 1 storage resources volume 133 may be on storage device 132 may be allocated to application 115 on virtual server 117 on host 106, and appropriate LUN-making may be set on storage device 132, but no appropriate zones are set on switches 124 and 122, and so volume 133 is not on any access path and can not be accessed by application 115 on virtual server 117.

Step 560: Determine the amount of virtual machine resources of each type and each Tier which are reserved at a reservation repository of the capacity manager and which are not yet allocated in the actual virtual machine storage environment components.

As described below in the specification of the change process, virtual machine resources on components may be reserved to applications before actually being allocated. A reserved virtual machine resource is then not allocated or reserved to another application.

For example, in the exemplary environment of FIG. 1, an additional virtual machine volume with a certain storage capacity on storage device 132 may be reserved for application 115 on virtual server 117 but not yet allocated on storage device 132.

FIG. 6 presents an exemplary virtual machine reservation specification based on a screen (600) in a Virtual Machine Capacity Manager. The details of the reservation request and the virtual machine resource requirements are inserted (610), and the outcome of the virtual machine reservation requirement is then provided (620).

Step 570: Summarize the above computed virtual machine resource amounts according to different categories and generate reports, diagrams, and notifications. Resource summary and categorization can for example be performed by applications, by groups of application or business units, by tiers, by infrastructure domains, by tier attributes, by costs (using a conversion of price per resource unit at different tiers), by power consumption, cooling requirements or space requirements (using a conversion of power or cooling requirement or space requirement by component or resource tier), by component location, by utilization levels, by allocated versus reserved virtual machine resources, by association with access paths or not, by points in time, etc.

For example, FIG. 7 presents an exemplary chargeback or cost summary report 700 generated by the Virtual Machine Capacity Manager 172 of FIG. 1. Three tiers for virtual machine storage resources are defined and the unit cost per gigabyte (GB) capacity for each tier is provided (710). The capacity and corresponding costs, categorized by different business units is provided for the Tier 2 storage resources (720), for Tier 3 storage resources (730), for Tier 1 storage resources (740), and the capacity of all the Tiers (750) and corresponding cost (760).

For example, FIG. 8 presents an exemplary chargeback or cost summary report with further breakdown by different days, generated by the Virtual Machine Capacity Manager 172 of FIG. 1. For each particular date (810), the storage capacity and corresponding costs, as well as the difference in each relative to the previous date, are provided for the Marketing Business Unit for Tier 2 (820), for Tier 3 (830), for Tier 1 (840), and the of all three tier levels (850).

Figure 9A:
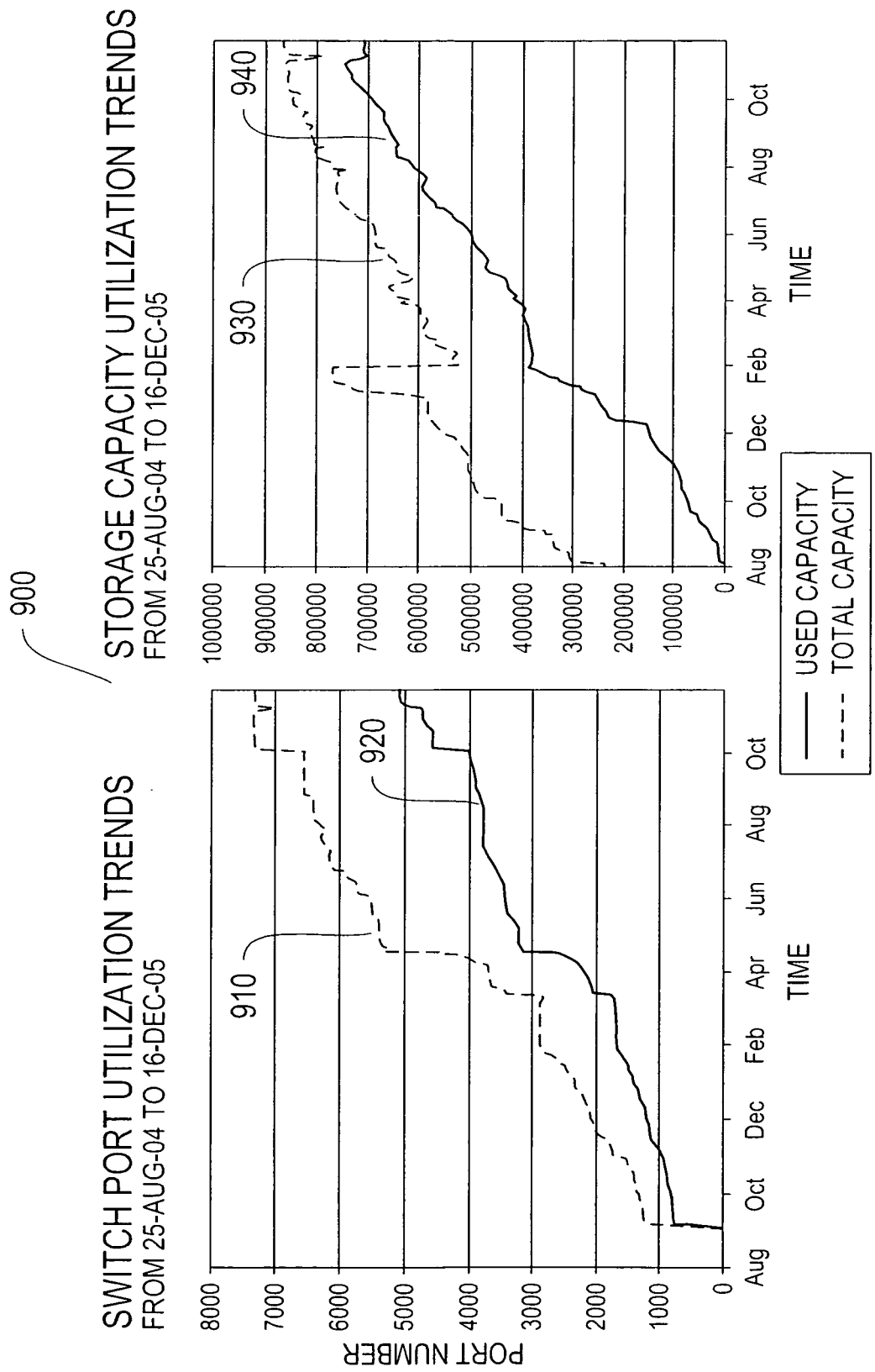
FIG. 9A shows a diagram with a plot of exemplary virtual machine resource utilization levels over a period of time.

FIG. 9A presents an exemplary diagram 900 plotting the virtual machine resource utilization levels over a period of time. Included are a plot summarizing the amount of storage resources which are allocated at different points in time during that interval (930), as well as a plot summarizing the amount of storage resources which exist in the environment at the corresponding points in time (940).

Figure 9B:
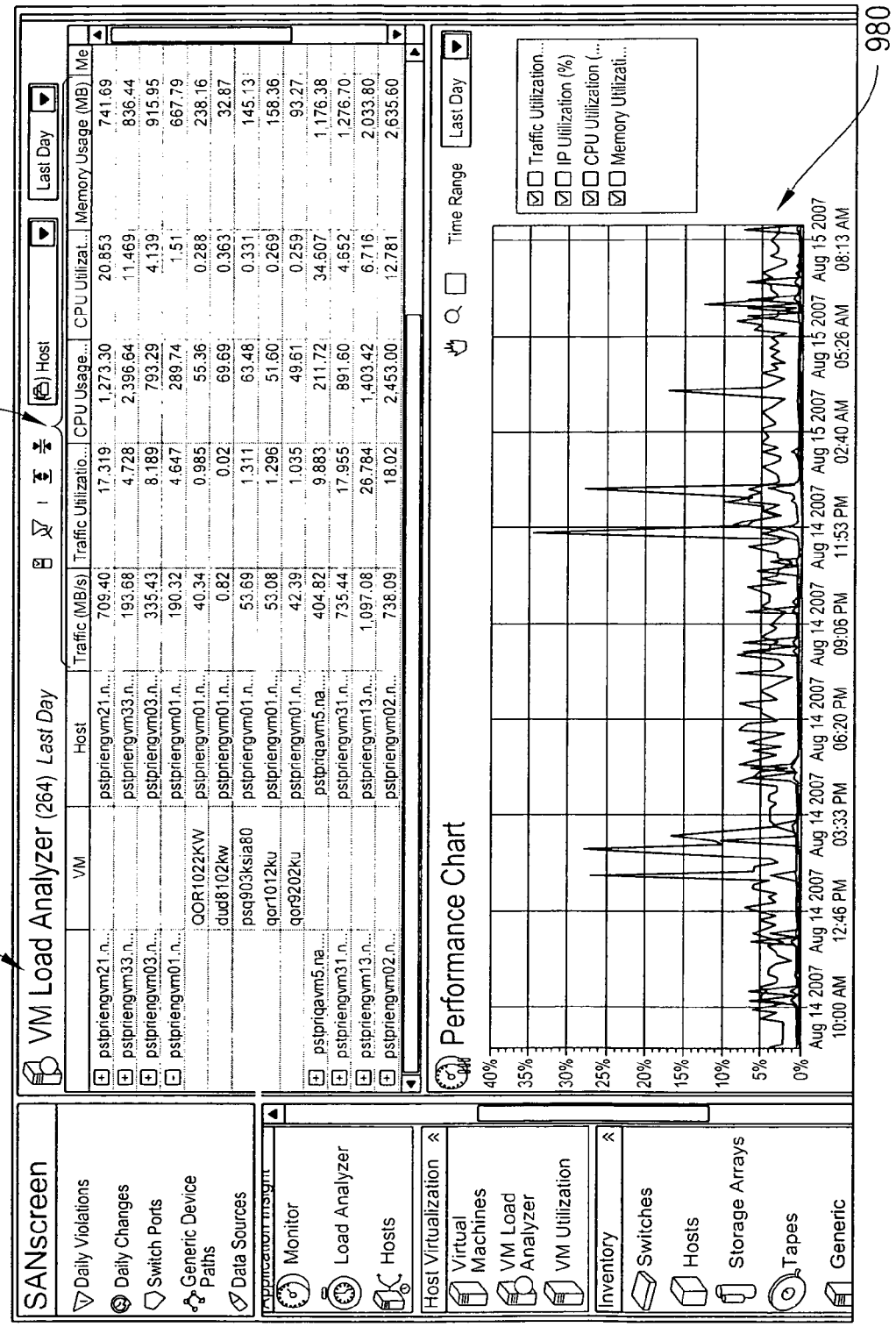
FIG. 9B shows an exemplary virtual machine load or capacity analysis with a set of performance charts generated in the virtual machine capacity manager.

FIG. 9B presents an exemplary window 950 generated by the virtual machine capacity manager 172 detailing the performance 950 of several clusters of virtual machines over a period of a day. This performance is measures in terms of traffic utilization, CPU utilization, memory usage, etc., and plotted versus time in graph 980. plotting the virtual machine resource utilization levels over a period of time. The utilization levels here may or may not violate the resource capacity policy.

In storage network environments, resource planning and consumption processes may be used to allocate or reserve virtual machine resources of different types and different tiers to each access path of the network. Virtual machine resources of different types and different tiers may be erroneously allocated or reserved such that the virtual machine resources end up not being assigned to any particular path, and the. These orphaned virtual machine resources may be produced, for example, as a result of an allocation mistake, an incomplete allocation process, or a decommissioning omission.

Furthermore, an occurrence of a network change event, such as a physical or logical change of state of one or more components on an access path associated with a virtual machine, (or a virtual machine change event) may also interfere with the execution of a planning or consumption process. A change event may be caused, for example, by a node failure, a faulty cable connection, a virtual server powering off, a virtual server powering on, or may be initiated based on a user request. Due to their unpredictable nature, these events tend to have different effects on any number of access paths and on any level or type of resources. In certain instances, a change event is planned, in which case the subsequent effects are expected and are consistent with a predictable level of resource usage. However, in other instances, a change event is unplanned, in which case the effects are unexpected and require an almost immediate response, such as allocating additional resources on a relatively short notice.

Figure 10A:
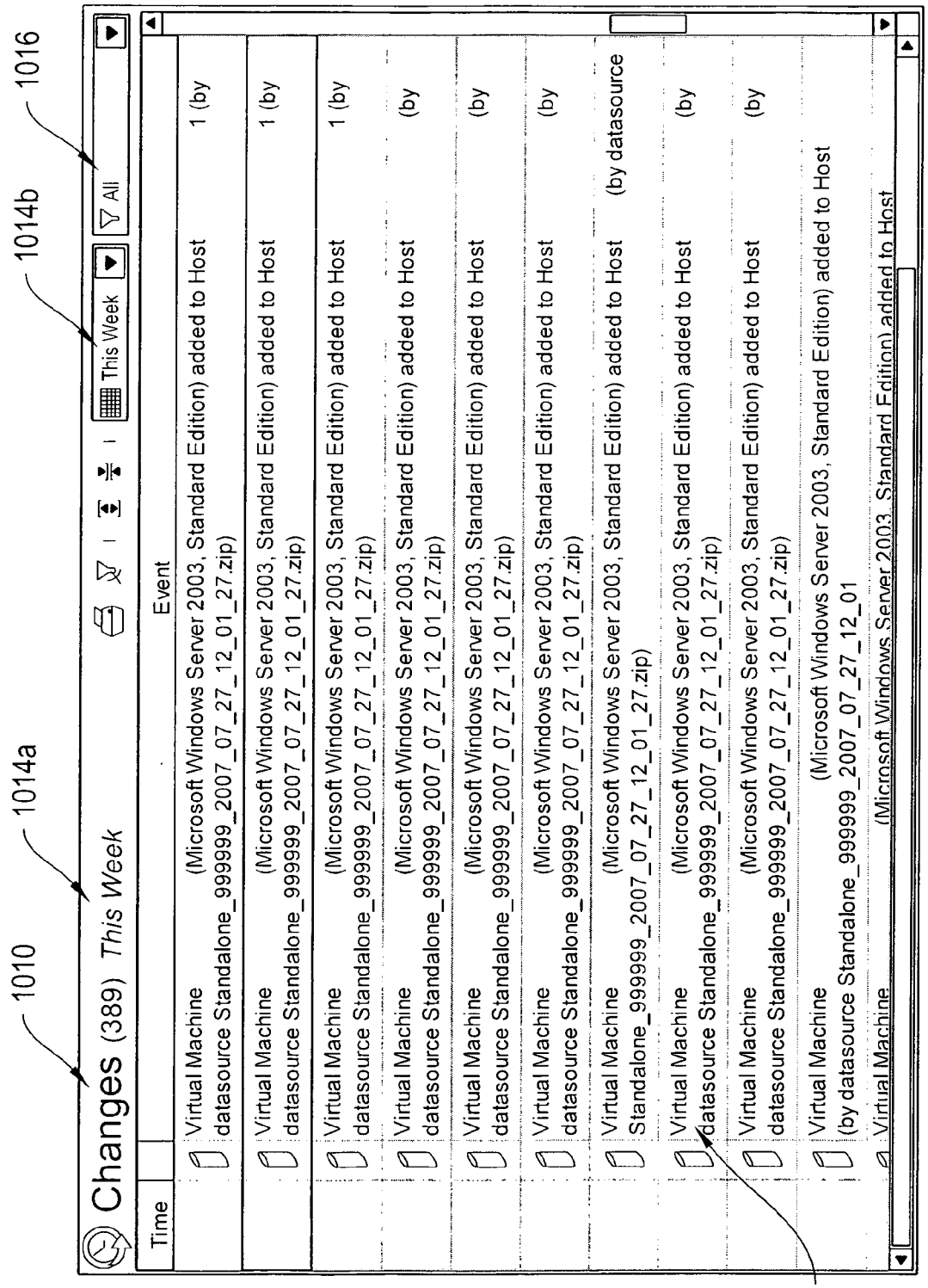
FIG. 10A depicts an exemplary virtual machine capacity projection and reconciliation management process.

FIG. 10A presents an exemplary listing 1010 of all (indicated by label 1016) virtual machine change events 1018 generated by the virtual machine capacity manager 172 of FIG. 1 over a time period of a week (indicated by labels 1014a and 1014b). The list 1018 illustrates, for example, the changes that have occurred as virtual machines were added to the storage network environment.

Figure 10B:
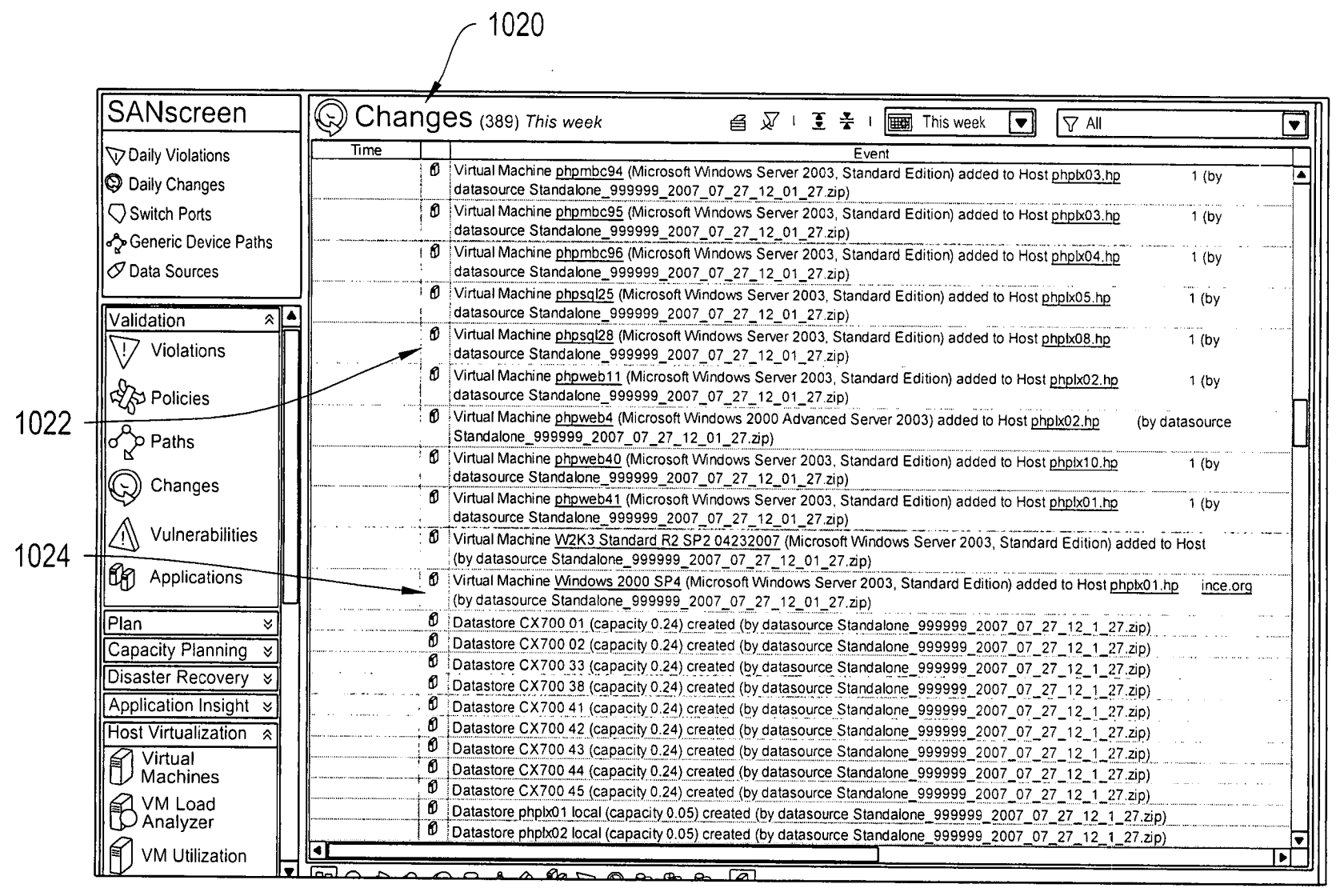

FIG. 10B presents an exemplary listing 1020 of all virtual machine change events 1018 generated by the virtual machine capacity manager 172 of FIG. 1 over a time period of a week. The list 1018 illustrates both changes associated with virtual machines 1022, and changes associated with data stores or data objects 1024 associated with the virtual machines. Again, these changes may have occurred as virtual machines were added to the storage network environment.

In some embodiments, dynamic virtual machine storage capacity manager 172 of FIG. 1 automatically aggregates virtual machine capacity information for different virtual machine resources types and tiers, from different network components at different stages of a virtual machine resource management cycle. This aggregation allows for tracking resource movements in a globally consistent and application-centric manner. In certain instances, the tracked virtual machine resource movements are used to estimate future virtual machine resource needs in order to drive optimal component purchases and virtual machine resource allocation or reservation. In certain instances, the tracked virtual machine resource movements are used to determine meaningful deviations between projected status and actual status of resource association, from which adjustments may be made to better predict future virtual machine capacity needs, for different types and tiers of virtual machine resources.

Figure 10C:
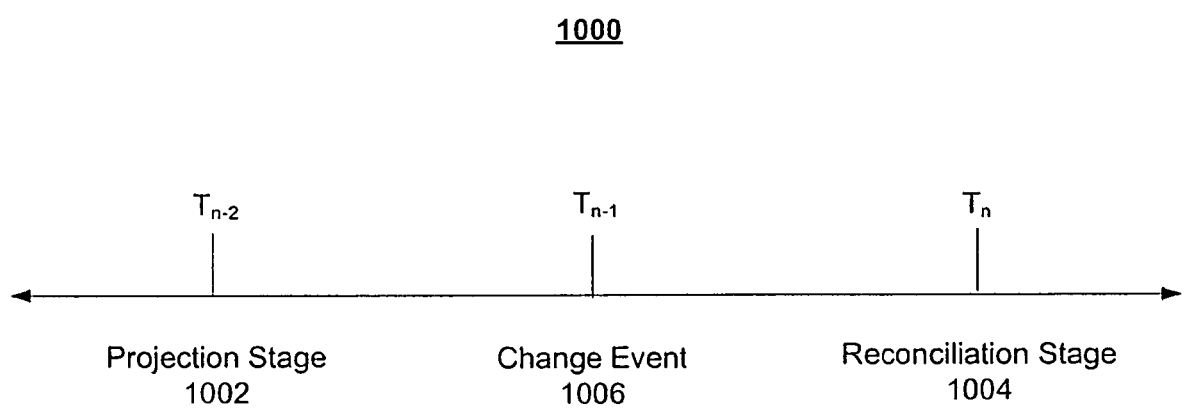
FIG. 10C presents an exemplary listing of virtual machine and data store change events generated by the virtual machine capacity manager.

FIG. 10C depicts an exemplary virtual machine capacity projection and reconciliation management process 1000. The process 1000 includes a projection stage 1002, occurring at time $T_{n-2}$, that provides a projection of virtual machine capacity requirement for each type and tier of resource an application is expected to request for use during a future time period between $T_{n-2}$ and $T_n$. The virtual machine capacity management process 1000 also includes a reconciliation stage 1002, occurring at time $T_n$, that compares actual virtual machine capacity association at $T_n$ to the projected virtual machine capacity requirement for $T_n$ which may be derived from the projection stage 1002 of process 1000. In one example, results of the comparison are used to adjust a projection of future virtual machine capacity requirement from time $T_n$ and onward. In another example, results of the comparison are used to generate reports that provide virtual machine resource allocation and utilization status summary as well as cost analysis related to each allocated or reserved virtual machine resource type and tier.

In certain instances, a mismatch may occur between the actual and predicted status determined at the reconciliation stage 1004. This mismatch is caused, for example, by a change event, such as virtual machine change event 1006 of FIG. 10C. As described above, this change event 1006 corresponds to a planned or unplanned request for virtual machine resources corresponding to an application. Consequently, a rebalance of virtual machine capacity and access paths associated with this rebalancing may be required when responding to such change event. Furthermore, the projected virtual machine capacity requirement generated from the projection stage 1002 may be updated at time $T_{n-1}$ to account for the occurrence of change event 1006 in order to refine the projection of virtual machine resource needs for the ensuing time period.

In general, even though one occurrence of virtual machine change event 1006 is illustrated in the capacity management process 1000 of FIG. 10C, no change, or multiple changes may occur between the projection stage 1002 and reconciliation stage 1006 of the depicted process 1000. This process 1000 may be executed on a continuous or a periodic, e.g., every 1 minute, basis so a user is able to make on-going adjustments to the projected virtual machine capacity requirement based on accumulated resource information. The projection stage 1002, reconciliation stage 1004, and virtual machine change event 1006 of the virtual machine capacity management process 1000 will be described below in further detail.

At the projection stage 1002, the virtual machine capacity management process 1000 estimates, for each application in a data network, the virtual machine resource capacity, for different types and different tiers, that the application is expected to request during the time period between $T_{n-2}$ and $T_n$. In one example, such estimation is obtained from an owner of the application based on his or her perception of future application requirements. In another example, the estimation of future virtual machine resource needs is based on historical trend analysis and extrapolation of past consumption or reservation pattern of different types and tiers of virtual machine resources associated with the application.

In yet another example, the estimation is based on information about component lease expiration cycles or other business cycles. The estimated virtual machine resource requirements are then written to a virtual machine resource policy, such as an expected virtual machine resource requirement policy, corresponding to each application. Similarly, virtual machine resource requirements for a network component may be written to a utilization level policy for that component, for a group of components, for component types, or for tiers, where the utilization level policy includes one or more utilization thresholds. The utilization level may include CPU utilization level in a virtual machine, memory utilization level in a virtual machine, or traffic utilization level in a virtual machine. In operation, a capacity allocation or reservation level above the designated thresholds may signify a need to increase existing virtual machine capacity for the pertinent component, type or tier, and a virtual machine allocation or reservation level below the designated thresholds may signify low utilization of the component and possible availability of the associated virtual machine resource.

Figure 11A:
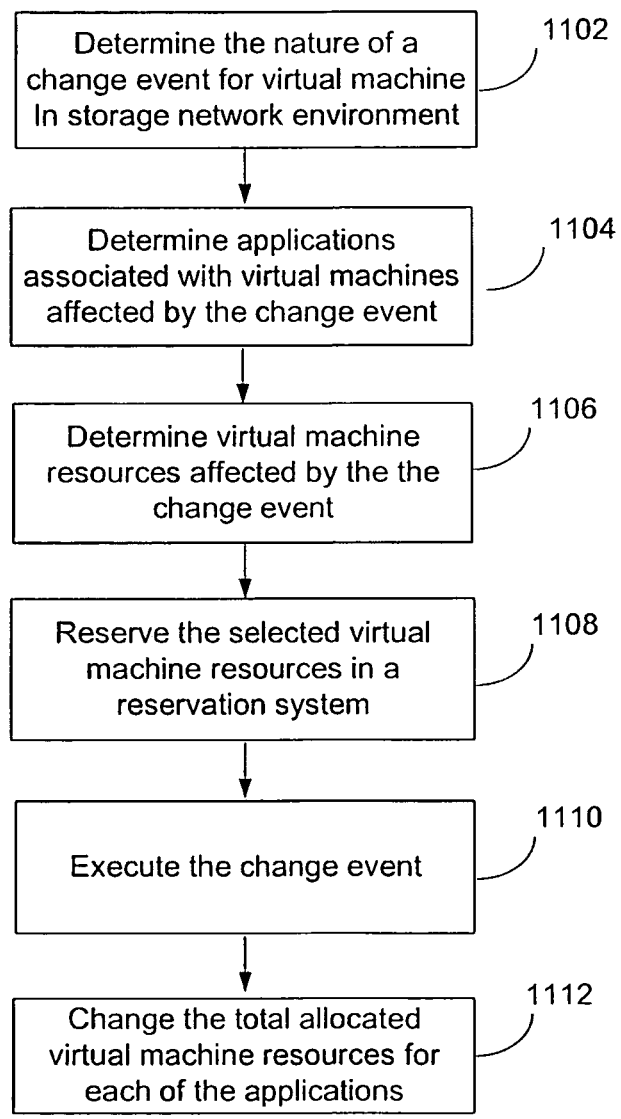
FIG. 11A illustrates an exemplary embodiment of the virtual machine capacity management process of FIG. 10A.
Figure 11B:
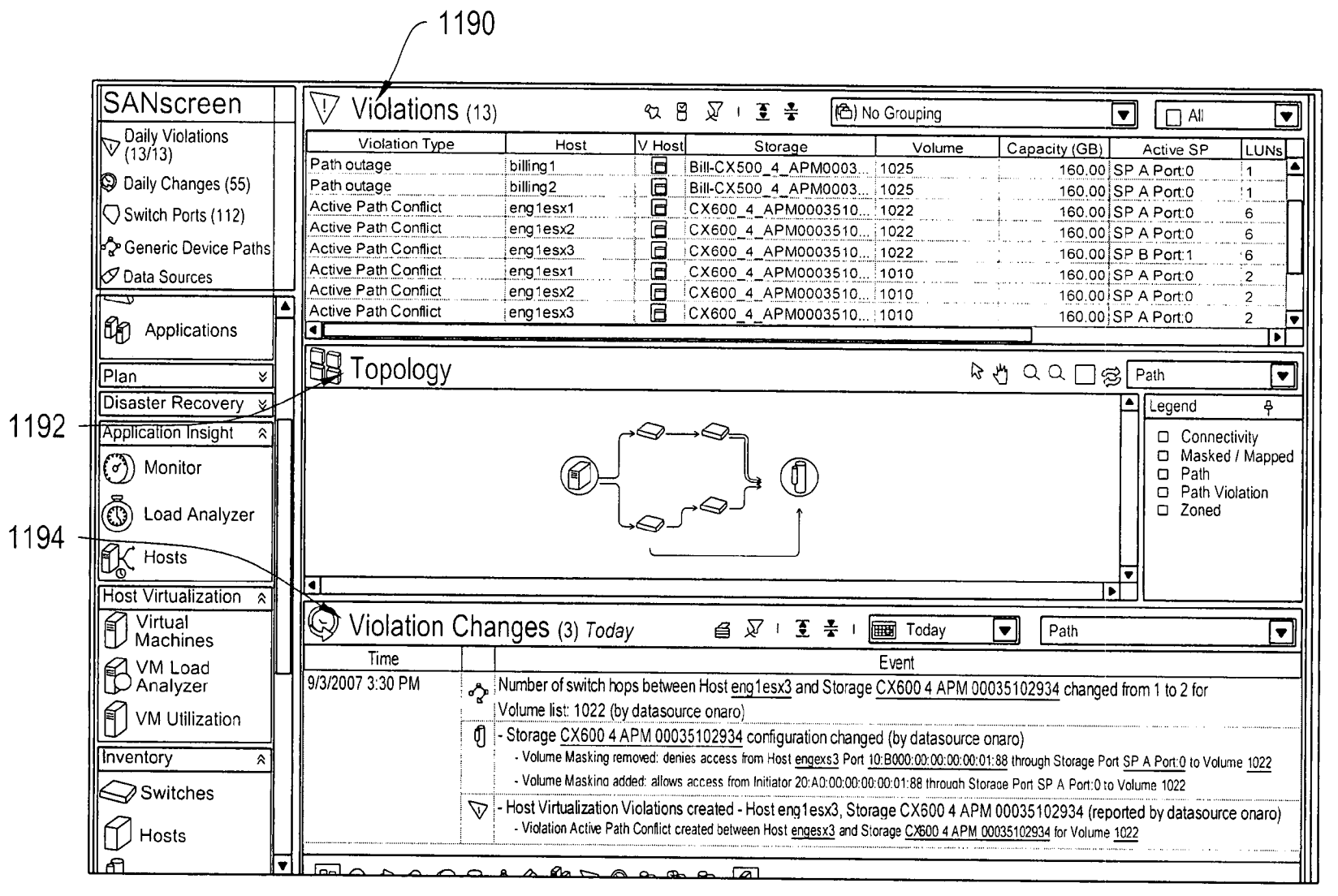

FIG. 11 illustrates an exemplary embodiment 1100 of the virtual machine capacity management process 1000 of FIG. 10C in response to an occurrence of a change event, such as virtual machine change event 1006 of FIG. 10C. The capacity management process 1000 first determines, at step 1102, the nature of the virtual machine change event 1006 in order to formulate the appropriate actions to such an event. The process 1000 then determines, at steps 1104 and 1106, one or more applications and resources in a data network that may be affected by the virtual machine change event. At step 1108, the process 1000 reserves the selected virtual machine resources, of appropriate types and tiers, in a reservation system corresponding each of the identified applications. The reservation system may be configured to prevent double reservation of the virtual machine resources by parallel change processes. Furthermore, at step 1110, process 1000 executes the allocation virtual machine change event at designated components of the storage environment, as set forth by the reservation made in step 1108. Finally, at step 1112, for each type of virtual machine resource that is successfully associated with an application, process 200 suitably adjusts a association value by virtual machine resource type corresponding to the application in order to track its virtual machine capacity assignment status.

The generalized process outlined in FIG. 11 may be applied to various types of change events in a SAN, e.g., SAN 100 of FIG. 1, that include, for example, disconnecting a device from or connecting a device to a data network, creating or destroying virtual machines or virtual machine servers, allocating or de-allocating virtual machines or virtual servers to applications, changing the storage capacity allocated to virtual machines, disconnecting a link from or connecting a link to a data network, adding a new device, updating device firmware, changing device zoning, changing device LUN-masking, requesting resource allocation, and requesting resource de-allocation.

With continued reference to FIG. 11, if the change event constitutes a user request, e.g. a request by a designated user such as a SAN administrator, to allocate additional virtual machine resources to an application identified at step 1104, process 1000 then proceeds to step 1106 at which the process uses, for example, a linear-least squares or other optimization technique to ascertain which virtual machine resource on which device is most suited for allocation to the application. The optimization technique may employ a number of optimization criteria to identify the optimal virtual machine resources. The process 1000 then reserves, at step 1108, the selected virtual machine resources in the reservation system and allocates, at step 1110, the reserved virtual machine resources to the applications at components designated by the reservation. Such change event execution also involves updating the connectivity of access paths in the storage environment. At step 1110, for each type of virtual machine resource that has been successfully allocated, process 1000 increases the association value by resource type and tier corresponding to the application.

In another example, if the change event includes a request by the user to de-allocate virtual machine resources associated with an application, process 1000 proceeds to step 1106 to identify the pertinent virtual machine resources for de-allocation. Subsequently, at step 1108, the process 1000 reserves the selected virtual machine resources using the virtual machine resource reservation system and performs the necessary operations, at step 1110, to dissolve the association between the identified application and virtual machine resources at components designated by the reservation. For each type of virtual machine resource that has been successfully de-allocated for the application, the process 1000 subtracts, at step 1112, an appropriate amount from the association value of the corresponding application. Each event detected in the storage environment, and each state computed, are stored indefinitely with the appropriate timestamp, description, and context information to be used for any required trending, projection, trouble-shooting, or audit processes.

Figure 12A:
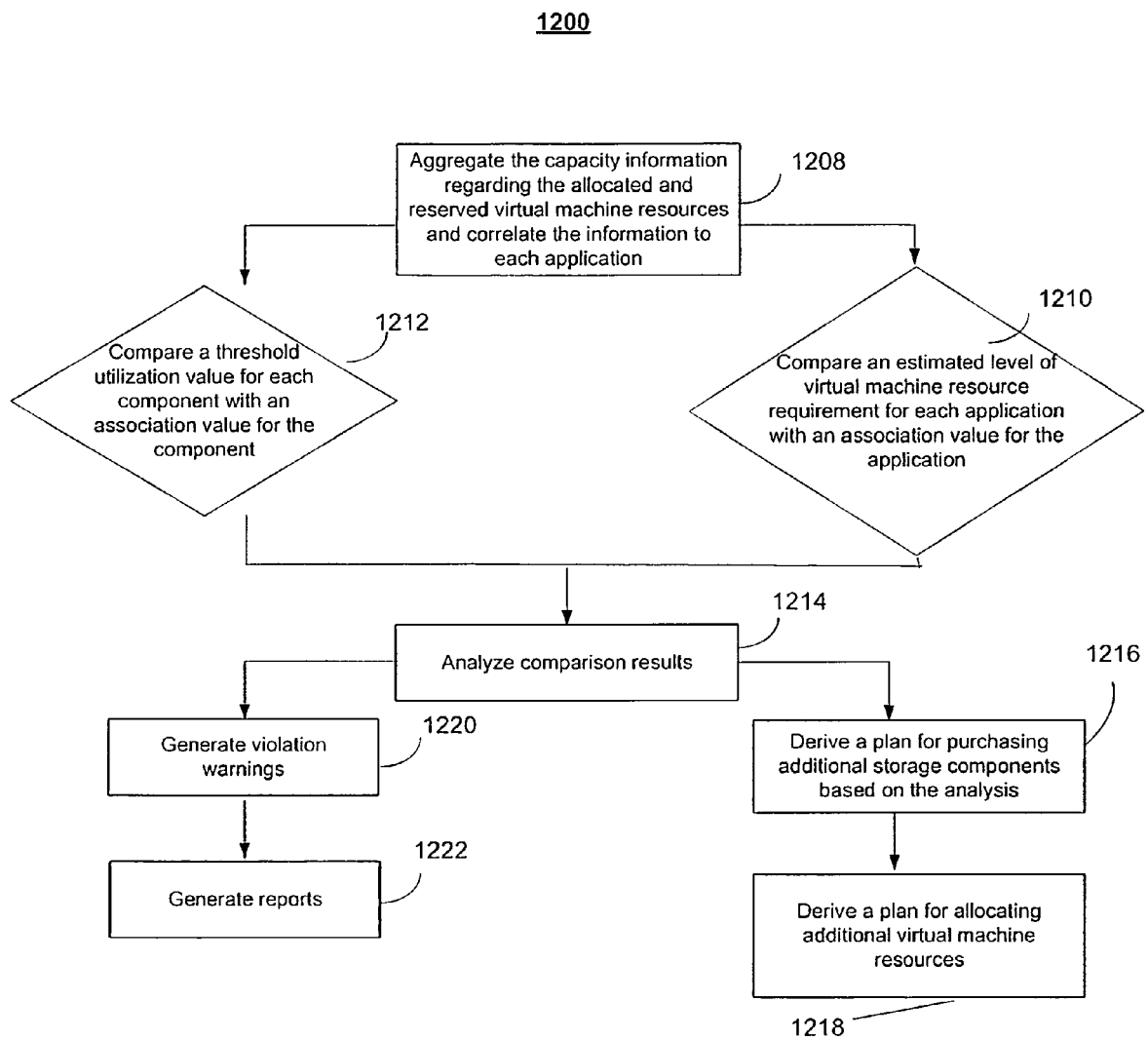
FIG. 12A illustrates an exemplary embodiment of the reconciliation stage process of FIG. 10A.

FIG. 12 illustrates an exemplary embodiment 1200 of the process 1000 at the reconciliation stage 1006 of FIG. 10C. The virtual machine capacity manager 172 of FIG. 1 first (step 1208) performs the virtual machine capacity assessment process described above in FIG. 11. Process 1000 proceeds by comparing the current virtual machine status generated at step 1208 of FIG. 12 with a projected status of virtual machine resource association generated from the projection stage 1002 of FIG. 10C. In one embodiment, the comparison is performed in an application-centric mariner. For example, the association value that tracks each type and tier of allocated and reserved virtual machine resource corresponding to an application may be compared, at step 1210, to the estimated level of capacity stored in an expected-resource requirement policy for that application. This comparison thus allows a user to evaluate virtual machine capacity association from an application-oriented perspective. In another embodiment, the comparison between the current status and the projected status of resource association is performed in a component-centric manner. For example, the current association value for each type of virtual machine resource corresponding to a network component may be compared, at step 1212, to the utilization threshold value stored in a utilization level policy corresponding to the component, or virtual machine resource type or tier. This comparison thus allows the user to evaluate capacity association from a component-oriented perspective.

At step 1214, based on an analysis of the comparisons performed at steps 1210 and 1212, several actions may occur. According to one action, if the expected virtual machine resource requirement is higher than, or close to, the current level of virtual machine resource association, the process 1000 is adapted to increase the size of current virtual machine resource inventory, such as allowing appropriate extra margins or acquiring additional devices. For example, the virtual machine capacity management process 1000 is able to first formulate and optimize plans for purchasing additional storage components at step 1218 and then optimally allocate or reserve virtual machine resources within the purchased components at step 1220 in response to the need for additional virtual machine storage capacity.

Figure 12B:
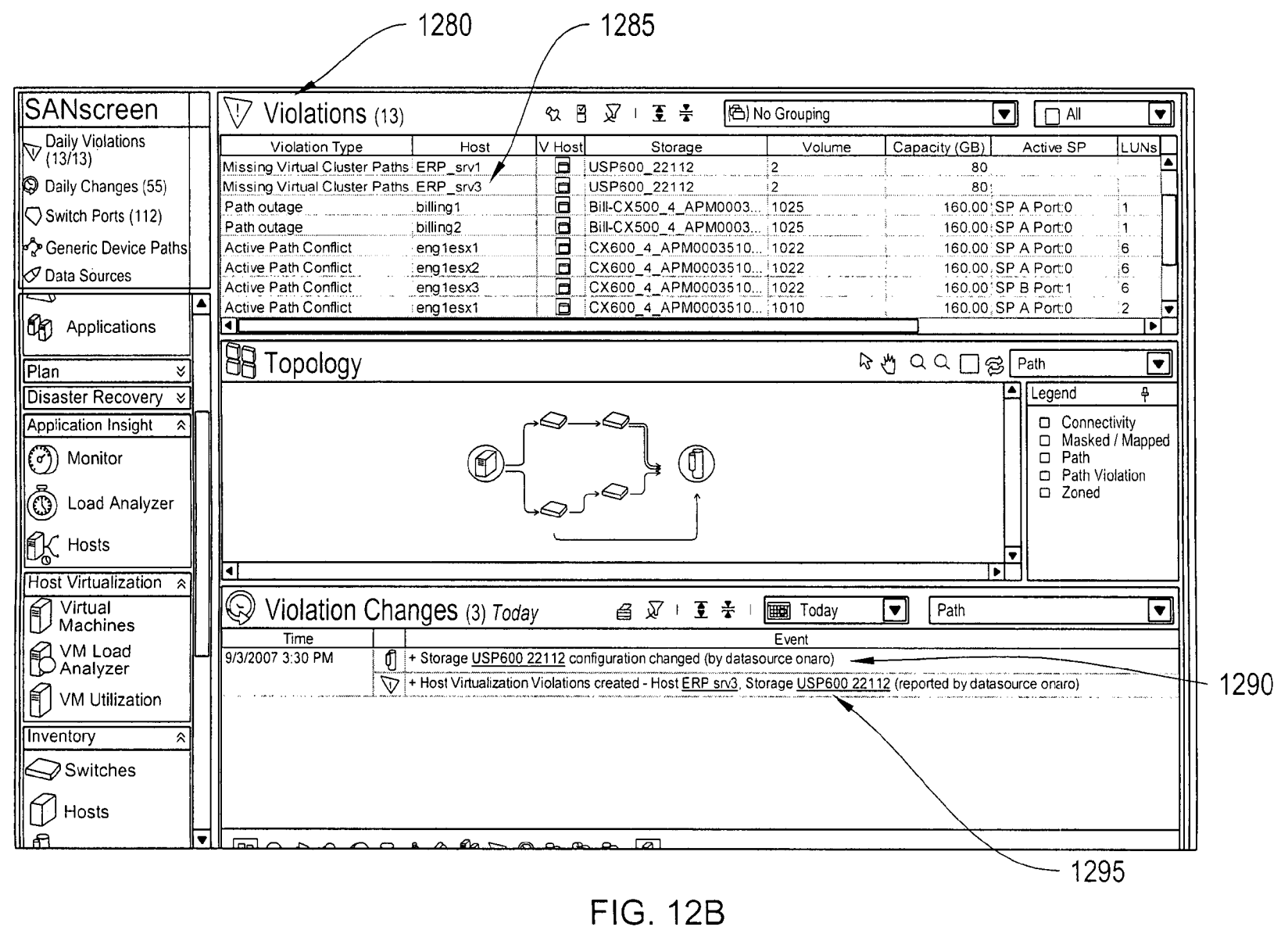

The analysis performed at step 1214 may also be used to detect, at step 1220, several types of virtual machine resource utilization violations. These violations include, for example, virtual machine resources allocated without an assigned access path (orphaned virtual machine resources) and virtual machine resources allocated to a path that is not necessary for achieving virtual machine service-level requirements specified for that path (e.g., virtual machine resources having more redundancy or data copies than required for that path). For instance, FIG. 12B depicts the violation notifications (1280) that may be generated due to an unexpected discovery of a missing virtual cluster path (1285). This violation may have occurred because either a new virtual server was created on a host (1290) or because the configuration of a storage device has changed (1295).

Other detectable violations include, for example, a virtual machine resource utilization level that is too low for a given virtual machine resource at a give component in relation to a lower bound threshold specified by the utilization policy of that virtual machine resource, a virtual machine resource utilization level that is too high for a given virtual machine resource at a given component in relation to an upper-bound threshold specified by the utilization policy of that virtual machine resource, and a virtual machine resource type having an association value that is higher than the expected virtual machine resource requirement value in its expected virtual machine resource requirement policy.

Furthermore, at step 1222, the virtual machine capacity management process 1000 may generate virtual machine resource allocation and utilization status summaries, broken down by different virtual machine resource types, attributes, applications, etc. The process 1000 is also able to produce reports providing cost analysis information that associates excessive cost to over-estimation or under-estimation of virtual machine resource requirements.

FIGS. 11 and 12 depict processes that allow the designated user to allocate resources on the storage area network. To this end, in one embodiment, the systems and methods described herein include a data processor unit having memory and executing processes for monitoring violations, and for responding to queries of the designated user. In this embodiment, the system may include a timestamp processor that associates a timestamp with an event, state or condition of interest to the designated user. For example, the timestamp processor may generate a timestamp and apply the stamp to a virtual machine resource allocation event, as well as to a virtual machine resource reservation event, a virtual machine resource allocation state, or a virtual machine resource reservation state, or any other event, state, or condition of interest to the designated user. The event, state, or condition selected will depend on the application being addressed. The system may also include a data memory that stores a list of past and present allocation events, states, and conditions. For example, the data memory may store virtual machine resource allocation states, virtual machine resource reservation states, virtual machine resource allocation events, or virtual machine resource reservation events, or any other allocation event, state, or condition. This list may be used by a query processor to provide responses to queries from a designated user about virtual machine resource allocation and virtual machine resource reservation at a given time.

Optionally, the system may include a projection processor for computing projections of virtual machine allocation states and virtual machine reservation states, and of virtual machine resources of specific types and tiers. This computation involves extrapolating and trending from past virtual machine allocation states and past virtual machine reservation states, and user input from designated users such as the time period over which the extrapolation and trending is performed. A query processor may use the computed projections to provide responses to queries from a designated user about virtual machine resource allocation and virtual machine resource reservation at a future time.

Further optionally, the system may include a utilization processor for estimating for a component type or tier in the storage network environment, the level of storage capacity utilization. The utilization processor may compute the level of utilization by computing a ratio of an amount of allocated and reserved virtual machine resources of a storage environment component, a virtual machine resource type, and a virtual machine resource tier, to the amount of allocated and reserved virtual machine resources corresponding to the respective storage environment component, virtual machine resource type, or virtual machine resource tier. The utilization processor may provide violation notifications if the computed ratio is higher or lower than a pre-selected threshold in the virtual machine capacity policy.

Figure 13:
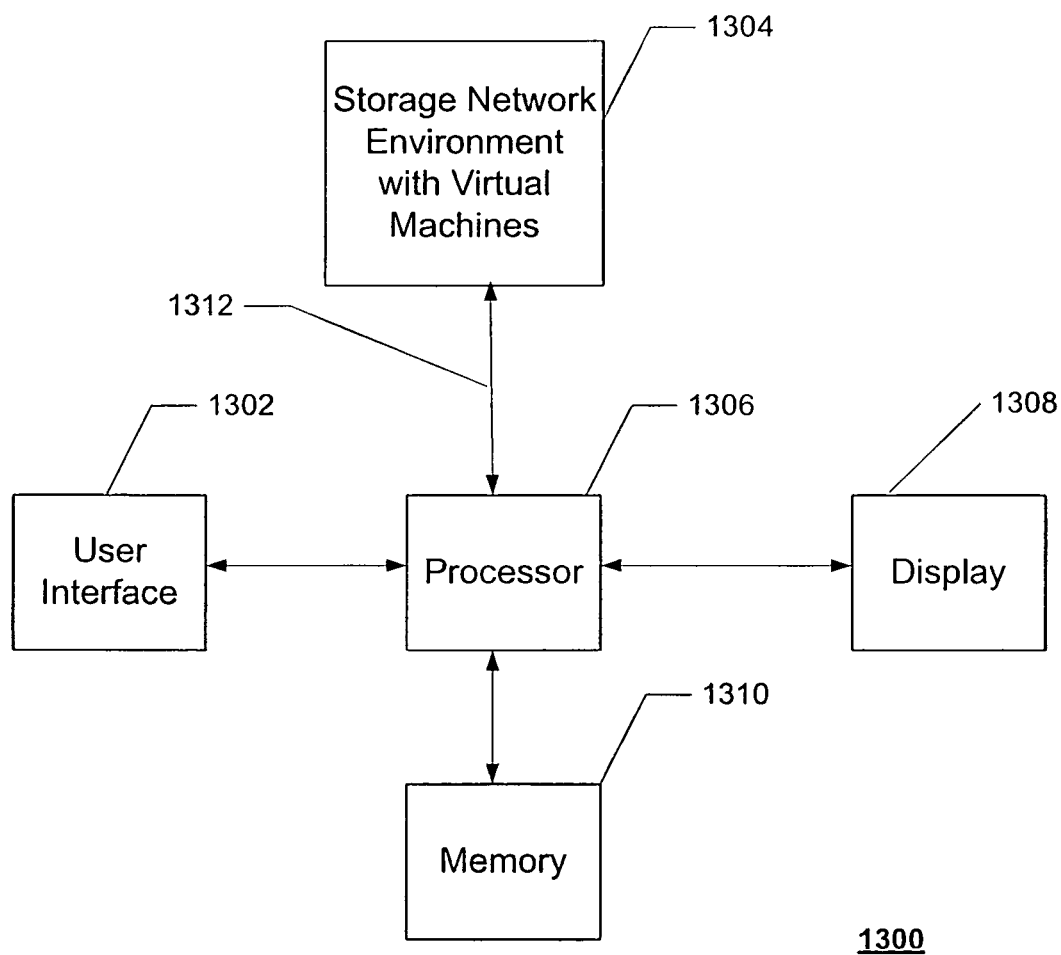
FIG. 13 shows a block diagram of a system 1300 for analyzing the data capacity in virtual machines in a storage network infrastructure according to an illustrative embodiment.

FIG. 13 shows in more detail the elements of one such system. In particular, FIG. 13 presents a block diagram of a system 1300 for analyzing and monitoring the virtual machine resource capacity of virtual machine storage devices in a storage network environment, as described in reference to FIGS. 1-12, according to an illustrative embodiment of the invention. System 1300 includes a processor 1306, a display 1308, a memory 1310, e.g., Random-Access Memory (RAM), a user interface 1302, and a storage network (with virtual machines) infrastructure 1304. SAN 100 in FIG. 1 is an example of a storage network infrastructure 1304 which could be in communication with processor 1306 of system 1300. Processor 1306 operates on information received from components in the storage network infrastructure 1304 in accordance with executable instructions loaded into memory 1310. For instance, virtual machine capacity manager 172, storage management platform 12, or virtual machine management platform 180 in SAN 100 of FIG. 1 may be in periodic communication with processor 1306 of system 1300. The instructions will ordinarily have been loaded into the memory from local persistent storage in the form of, e.g., a disc drive with which the memory communicates. The instructions may additionally or instead be received by way of user interface 1302.

System 1300 displays the processed information on display 1308. Display 1308 may be any display device capable of interfacing with processor 1306, e.g., an LCD display or a CRT monitor. One or more human users may interact with display 1308 via user interface 1302. For instance, system 1300 could receive user input via user interface 1302 from devices such as a mouse and a keyboard. The user input could also originate from devices connected to user interface 1302 remotely, e.g., via a network connection.

System 1300 can be used to implement a method for analyzing and monitoring the resource capacity of virtual machines in a storage network environment data traffic loads associated with applications in a storage network.

Processor 1306 in system 1300 is configured to operate on information 1312 from the storage network 1304. In particular, processor 1306 is configured to communicate with storage network 1304 to identify logical access paths in the storage network infrastructure 1304, as will be described below in reference to FIG. 2. Processor 1306 is configure to communicate with storage network infrastructure 1304 to collect and store current state configuration information and current data traffic flow information from sources in the network. Processor 1306 is also configured communicate with storage network infrastructure 1304 to compute allocated and reserved virtual machine resources associated with logical access paths in the storage network infrastructure 1304 over the user-specified interval of time using the current state configuration information. Processor 1306 may receive and store expected allocated and reserved virtual machine resources associated with logical access paths in the storage network infrastructure 1304. Processor 1306 is also configured to display notification messages on display 1308 of system 1300 based on whether these allocated and reserved virtual machine resources are within a pre-selected threshold or range. A designated user e.g. SAN or VM administrator interacting with user interface 1302 may select this threshold or range, as will be described further in reference to FIGS. 3, 4, and 8.

It will be apparent to those of ordinary skill in the art that methods involved herein may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

While the invention has been disclosed in connection with the embodiments shown and described in detail, various modifications and improvements may be made thereto without departing from the spirit and scope of the invention. By way of example, although the illustrative embodiments are depicted with reference to a storage area network (SAN), this need not be the case. Instead, other storage infrastructures with defined access paths may employ the method of the invention, and the network fabric may include any type of device that provides the described connectivity between storage environment components. Accordingly, the spirit and scope of the present invention is to be limited only by the following claims.

What is claimed is:

1. A process for analyzing virtual machines in a storage network environment for compliance with a resource capacity policy comprising:

collecting, without use of a host agent operating on the virtual machines, component configuration and connectivity information from components in the network environment;

deriving access paths defining end-to-end access relationships between an application on a virtual machine and storage data objects associated with the virtual machine in the network environment, wherein an access path includes a sequence of components enabling information flow between an application residing on a virtual machine and a data object, wherein deriving access paths comprises mapping network component configuration and connectivity information to nodes and edges of a graph and determining whether information can flow between nodes in the graph, wherein a node in the graph represents a component in the storage network environment, and an edge represents information flow capability between two components, wherein the information flow capability is determined by a physical communication link between the two components and the logical state configurations of the two components;

computing access path resource consumption and determining a respective rank classification of a virtual machine on the respective access path based on a level of storage service supported by the virtual machine; and identifying virtual machines with resource consumptions and respective rank classifications that violate the resource capacity policy.

2. The process of claim 1, wherein the resource capacity policy includes a list of virtual machines in the storage network environment and the storage capacity allocated to each of the virtual machines.

3. The process of claim 1, wherein the access paths have access path attributes including at least one of a number of hops within an access path, a level of end-to-end redundancy for an access path, and a number of allocated ports for an access path.

4. A process for analyzing virtual machines in a storage network environment for compliance with a resource capacity policy comprising:

collecting, without use of a host agent operating on the virtual machines, component configuration and connectivity information from components in the network environment;

deriving access paths defining end-to-end access relationships between an application on a virtual machine and storage data objects associated with the virtual machine in the network environment, wherein an access path includes a sequence of components enabling information flow between an application residing on a virtual machine and a data object;

computing access path resource consumption and determining a respective rank classification of a virtual machine on the respective access path based on a level of storage service supported by the virtual machine;

identifying virtual machines with resource consumptions and respective rank classifications that violate the resource capacity policy;

accumulating for an application the amount of allocated and reserved virtual machine resources allocated to the application and classifying the allocated and reserved virtual machine resources into tiers and into allocated and reserved virtual machine resources on the respective access paths and allocated and reserved virtual machine resources not on a respective access path;

monitoring the network environment and the resource capacity policy;

detecting virtual machine state change events and obtaining updated virtual machine state information;

using the updated virtual machine state information to compute for an application an accumulated amount of allocated and reserved virtual machine resources allocated to the application and their rank classifications; and using the updated state information to analyze the allocated and reserved virtual machine resources allocated to or reserved for the application and determine whether the allocated and reserved virtual machine resources are currently accessible by the application via an access path associated with the virtual machines.

5. The process of claim 1, further comprising of periodically generating summary reports about the virtual machines in the network containing:

a current amount of allocated and reserved virtual machine resources;

a ratio of the amount of allocated and reserved virtual machine resources to an amount of available virtual machine resources in the corresponding component, or to an amount of allocated and reserved virtual machine resources at other components of the same type and tier; and a cost of the allocated or reserved virtual machine resources.

6. A process for analyzing virtual machines in a storage network environment for compliance with a resource capacity policy, comprising:

collecting, without use of a host agent operating on the virtual machines, component configuration and connectivity information from components in the network environment;

deriving access paths defining end-to-end access relationships between an application on a virtual machine and storage data objects associated with the virtual machine in the network environment, wherein an access path includes a sequence of components enabling information flow between an application residing on a virtual machine and a data object, and wherein the access paths have access path attributes, said access path attributes including at least one of a number of hops within an access path, a level of end-to-end redundancy for an access path, and a number of allocated ports for an access path;

using the component configuration and connectivity information to construct a graph to derive access paths by determining whether information can flow between nodes in the graph, wherein nodes in the graph represent components in the storage network environment, and edges represent information flow capability between two components, and wherein the information flow capability is determined by a physical communication link between the two components and the logical state configurations of the two components;

computing access path resource consumption and a respective rank classification of a virtual machine on a respective access path based on a level of storage service supported by the virtual machine; and identifying virtual machines by comparing the constructed graph to the resource capacity policy to identify violations.

7. The process of claim 6, wherein the resource capacity policy includes a list of virtual machines in the storage network environment and the storage capacity allocated to each of the virtual machines.

8. A process for responding to a state change request for a virtual machine in a storage network environment comprising:
   selecting virtual machine resources for satisfying the request;
   deriving access paths associated with the respective virtual machines, wherein an access path includes a sequence of components enabling information flow between an application residing on a virtual machine and a data object on a respective storage device;
   computing access path attributes for the access paths associated with the selected virtual machines;
   planning allocation of the virtual machine resources;
   reserving virtual machine resources of a selected type and a selected rank classification based on a level of storage service supported by the respective virtual machines;
   allocating each reserved virtual machine resource;
   making additional virtual machine resources available;
   validating the request has been satisfied; and
   notifying designated users of the validation.

9. The process of claim 8, wherein reserving a virtual machine resource comprises checking that the virtual machine resource is not already reserved; checking that the virtual machine resource is not already allocated; informing the reservation repository about the virtual machine resource and reservation attributes, including an associated application, a reservation timestamp, a reservation user, and constraints associated with converting the reserved virtual machine resource to an allocated virtual machine resource.

10. The process of claim 8, wherein allocating virtual machine resources comprises:
    checking that a virtual machine resource is not already reserved by another application;
    checking that the virtual machine resource is not already allocated;
    informing the reservation repository about the virtual machine resource and allocation attributes, including an associated application, an allocation timestamp, and an allocation user; and
    updating the state of a corresponding environment component to associate the reserved virtual machine resource with a corresponding application.

11. The process of claim 8, wherein making additional virtual machine resources available comprises: informing the reservation repository that the virtual machine resources are available and updating the state of the corresponding environment component to disassociate the corresponding virtual machines from any application.

12. A system for managing the capacity of virtual machine resources associated with applications in a storage network environment, comprising:
    a user interface;
    a display;
    a memory for storing computer-executable instructions;
    a processor in communication with the storage network environment, the processor configured for:
      collecting information from sources in the network environment and deriving access paths defining end-to-end access relationships between an application on a virtual server and data objects associated with the virtual server in the network environment, wherein an access path includes a sequence of components configured to enable information flow between an application residing on a virtual machine and a data object on a respective storage device;
      establishing rank classifications representative of the importance of a virtual machine resource in the network, and based on a level of storage service supported by the virtual machine;
      computing for an access path associated with respective virtual machines the amount of its allocated and reserved virtual machine resources and the corresponding rank classifications;
      collecting information about virtual machine resources from a virtual machine management platform and rank classifications reserved for a host application from a storage management platform;
      accumulating for an application the amount of allocated and reserved virtual machine resources allocated to the application and classifying allocated and reserved virtual machine resources tiers and into allocated and reserved virtual machine resources on access paths and allocated and reserved virtual machine resources not on access paths;
      constructing a virtual machine resource capacity policy, said policy containing required attributes of virtual machine resources of different types and different tiers reserved or allocated for a set of applications;
      periodically collecting information from the storage environment components, the reservation repository, and the capacity policy repository and identifying a violation; and displaying the violation on the display.

13. The system of claim 12, wherein a violation is selected from the group of:
    a virtual machine resource that is allocated to an application but is not accessible to that application via an access path;
    a virtual machine resource that is reserved by an application but not allocated to said application within a preselected interval of time;
    a virtual machine resource that is allocated to an application but with a type or a tier not consistent with the requirements of the capacity policy repository;
    an amount of resources reserved by an application or allocated to an application not consistent with the requirements of the capacity policy repository; and
    an amount of virtual machine resources reserved or allocated to a set of storage environment components not consistent with the requirements of the capacity policy repository.

14. The system of claim 12, wherein the processor includes:
    a timestamp processor for associating a timestamp with an event selected from the group of a virtual machine resource allocation event, a virtual machine resource reservation event, a virtual machine resource allocation state, and a virtual machine resource reservation state;
    a data memory storing a list of past and present virtual machine resource allocation states, virtual machine resource reservation states, virtual machine resource allocation events, and virtual machine resource reservations events; and
    a query processor for using the list to provide responses to queries about virtual machine resource allocation and virtual machine resource reservation at a given time.

15. The system of claim 12, wherein the processor includes:
    a projection processor for computing projections of virtual machine allocation states and virtual machine reservation states and of virtual machine resources of specific types and tiers, wherein the computation involves extrapolating and trending from past virtual machine allocation states and past virtual machine reservation states, and using external input from authorized users; and a query processor for using the computed projections to provide responses to queries from a designated user interacting with the user interface about virtual machine resource allocation and virtual machine resource reservation at a future time.

16. The system of claim 15, wherein the processor includes a utilization processor for estimating for a component type or tier, the level of storage capacity utilization.

17. The system of claim 16, wherein the level of storage capacity utilization is the percent of storage capacity utilized by the component.

18. The system of claim 16, wherein the utilization processor computes the level of utilization by computing a ratio of an amount of allocated and reserved virtual machine resources of a storage environment component, a virtual machine resource type, and a virtual machine resource tier, to the amount of allocated and reserved virtual machine resources corresponding to the storage environment component, the virtual machine resource type, or the virtual machine resource tier; and providing violation notifications if the computed ratio is higher or lower than a pre-selected threshold in the virtual machine capacity policy repository.

19. The system of claim 17, wherein the processor includes a comparison processor for:
periodically computing current virtual machine allocation and reservations of different applications and different virtual machine resources types and tiers;
comparing the current virtual machine allocation and reservation with the computed projections; and
generating and displaying a projection violation notification on the display for use by a designated user, updating the computed projections, and sending the notification to a designated user.

20. A method for managing the capacity of virtual machine resources associated with applications in a storage network environment, comprising:
collecting information from sources in the network environment and deriving access paths defining end-to-end access relationships between an application on a virtual server and data objects associated with the virtual server in the network environment, wherein an access path includes a sequence of components configured to enable information flow between an application residing on a virtual machine and a data object on a respective storage device;
establishing rank classifications representative of the importance of a virtual machine resource in the network, and based on a level of storage service supported by the virtual machine;
computing for an access path associated with respective virtual machines the amount of its allocated and reserved virtual machine resources and the corresponding rank classifications;
collecting information about virtual machine resources from a virtual machine management platform and rank classifications reserved for a host application from a storage management platform;
accumulating for an application the amount of allocated and reserved virtual machine resources allocated to the application and classifying allocated and reserved virtual machine resources tiers and into allocated and reserved virtual machine resources on access paths and allocated and reserved virtual machine resources not on access paths;
constructing a virtual machine resource capacity policy, said policy containing required attributes of virtual machine resources of different types and different tiers reserved or allocated for a set of applications; and
periodically collecting information from the storage environment components, the reservation repository, and the capacity policy repository and identifying a violation.

21. The method of claim 20, wherein a violation is selected from the group of:
a virtual machine resource that is allocated to an application but is not accessible to that application via an access path;
a virtual machine resource that is reserved by an application but not allocated to said application within a pre-selected interval of time;
a virtual machine resource that is allocated to an application but with a type or a tier not consistent with the requirements of the capacity policy repository;
an amount of resources reserved by an application or allocated to an application not consistent with the requirements of the capacity policy repository; and
an amount of virtual machine resources reserved or allocated to a set of storage environment components not consistent with the requirements of the capacity policy repository.

22. The method of claim 20, further comprising:
associating a timestamp with a virtual machine resource allocation event and a respective virtual machine resource reservation event;
associating a timestamp with a virtual machine resource allocation state and updating the timestamp after a new virtual machine resource allocation event;
associating a timestamp with a virtual machine resource reservation state and updating the timestamp after a new virtual machine resource reservation event;
maintaining a list of past and present virtual machine resource allocation states, virtual machine resource reservation states, virtual machine resource allocation events, and virtual machine resource reservations events; and
using the list to provide responses to queries about virtual machine resource allocation and virtual machine resource reservation at a given time.

23. The method of claim 22, further comprising
computing projections of virtual machine allocation states and virtual machine reservation states and of virtual machine resources of specific types and tiers, wherein the computation involves extrapolating and trending from past virtual machine allocation states and past virtual machine reservation states, and using external input from a designated user; and
using the computed projections to provide responses to queries about virtual machine resource allocation and virtual machine resource reservation at a future time.

24. The method of claim 23, further comprising estimating for a component type or tier, a level of storage capacity utilization.

25. The method of claim 24, wherein the level of utilization is the percent of storage capacity utilized by the component.

26. The method of claim 24, wherein the level of utilization is computed as a ratio of an amount of allocated and reserved virtual machine resources of a storage environment component, a virtual machine resource type, and a virtual machine resource tier, to the amount of allocated and reserved virtual machine resources corresponding to the storage environment component, the virtual machine resource type, or the virtual machine resource tier; and providing violation notifications if the computed ratio is higher or lower than a pre-selected threshold in the virtual machine capacity policy repository.

27. The method of claim 26, further comprising:
periodically computing current virtual machine allocation and reservations of different applications and different virtual machine resources types and tiers;
comparing the current virtual machine allocation and reservation with the computed projections;
generating a projection violation notification, updating the computed projections, and sending the notification to a designated user.

28. The process of claim 1, wherein the respective rank classification for the virtual machine on the respective access path represents a rank classification relative to other virtual machines in the storage network environment.

29. The process of claim 6, wherein the respective rank classification for the virtual machine on the respective access path represents a rank classification relative to other virtual machines in the storage network environment.

30. The process of claim 8, wherein the selected rank classification for the reserved virtual machine resources represents a rank classification relative to other virtual machine resources in the storage network environment.

\* \* \* \* \*